(12) United States Patent
Yiu et al.

(10) Patent No.: US 11,664,951 B2
(45) Date of Patent: May 30, 2023

(54) METHODS AND ARRANGEMENTS FOR MEASUREMENT GAP CONFIGURATION

(71) Applicant: Apple Inc., Cupertino, CA (US)

(72) Inventors: Candy Yiu, Portland, OR (US); Jie Cui, Santa Clara, CA (US); Yang Tang, San Jose, CA (US); Youn Hyoung Heo, Seoul (KR)

(73) Assignee: Apple Inc., Cupertino, CA (US)

(*) Notice: Subject to any disclaimer, the term of this patent is extended or adjusted under 35 U.S.C. 154(b) by 279 days.

(21) Appl. No.: 16/976,873

(22) PCT Filed: Aug. 10, 2018

(86) PCT No.: PCT/US2018/046351
§ 371 (c)(1),
(2) Date: Aug. 31, 2020

(87) PCT Pub. No.: WO2019/033058
PCT Pub. Date: Feb. 14, 2019

(65) Prior Publication Data
US 2021/0367741 A1 Nov. 25, 2021

Related U.S. Application Data

(60) Provisional application No. 62/543,711, filed on Aug. 10, 2017.

(51) Int. Cl.
*H04L 5/00* (2006.01)
*H04W 24/10* (2009.01)

(52) U.S. Cl.
CPC ........... *H04L 5/0057* (2013.01); *H04W 24/10* (2013.01)

(58) Field of Classification Search
CPC ..... H04L 5/0057; H04L 5/0007; H04L 5/005; H04W 24/10; H04W 36/0069; H04W 36/0088; H04W 8/24
See application file for complete search history.

(56) References Cited

U.S. PATENT DOCUMENTS

2015/0327104 A1* 11/2015 Yiu .................. H04W 36/0069
  455/450
2016/0262000 A1   9/2016 Koorapaty et al.
(Continued)

FOREIGN PATENT DOCUMENTS

WO   WO-2018064068 A1 *  4/2018  ........ H04W 28/0252
WO   WO-2018209247 A1 * 11/2018  ......... H04L 27/2613

OTHER PUBLICATIONS

International Search Report dated Dec. 3, 2018 for International Application No. PCT/US2018/046351.
(Continued)

*Primary Examiner* — Charles C Jiang
*Assistant Examiner* — Shawn D Miller
(74) *Attorney, Agent, or Firm* — Eschweiler & Potashnik, LLC

(57) ABSTRACT

Logic may receive an initial communication from a user device, the initial communication comprising capabilities. Logic may determine, based on an indication of a capability to support new radio frequency layers from the capabilities for the user device, a measurement gap configuration for the new radio frequency layers and a measurement gap configuration for a channel state information reference signal. Logic may send a frame with a preamble to a physical layer comprising the measurement gap configuration. Logic may send an initial communication to a physical layer, wherein the initial communication comprises capabilities for a user device. Logic may decode downlink data with a measurement gap configuration. And logic may parse the measurement gap configuration to determine at least one measurement gap identification and at least one offset for the new radio frequency layers and a channel state information reference signal.

25 Claims, 12 Drawing Sheets

(56) References Cited

U.S. PATENT DOCUMENTS

| | | | | |
|---|---|---|---|---|
| 2016/0337916 A1* | 11/2016 | Deenoo | ............. | H04W 36/0094 |
| 2017/0048108 A1 | 2/2017 | Yi et al. | | |
| 2017/0223667 A1 | 8/2017 | Yi et al. | | |
| 2018/0063736 A1* | 3/2018 | Sadeghi | ............ | H04W 72/0446 |
| 2018/0192432 A1* | 7/2018 | Tenny | ............... | H04W 72/1289 |
| 2018/0324624 A1* | 11/2018 | Gu | .................... | H04W 36/0088 |
| 2019/0363809 A1* | 11/2019 | Yoon | ...................... | H04W 56/00 |
| 2020/0014523 A1* | 1/2020 | Huang | .................... | H04L 5/001 |
| 2020/0163036 A1* | 5/2020 | Fan | ....................... | H04W 48/16 |
| 2020/0169906 A1* | 5/2020 | Tsuboi | .................. | H04W 76/27 |

OTHER PUBLICATIONS

International Preliminary Report on Patentability dated Feb. 11, 2020 for International Application No. PCT/US2018/046351.
RAN WG4, "LS on Measurement Gap Enhancement," R2-166017, 3GPP TSG RAN WG2 Meeting #95bis, Kaohsiung, Sep. 27, 2016.
Extended European Search Report dated Apr. 21, 2021 for European Application No. 18844987.0.
Intel Corporation: "On NR RRM work", 3GPP Draft; R4-1703138 On NR RRM Work, 3rd Generation Partnership Project (3GPP), Mobile Competence Centre; 650, Route Des Lucioles ; F-06921 Sophia-Antipolis Cedex France; vol. RAN WG4, No. Spokane, USA; Apr. 3, 2017-Apr. 7, 2017; Apr. 3, 2017 (Apr. 3, 2017), XP051246347.
CMCC: "Discussion on measurement capability for NR", 3GPP Draft; R4-1706558 Measurement Capability, 3rd Generation Partnership Project (3GPP), Mobile Competence Centre; 650, Route Des Lucioles F-06921 Sophia-Antipolis Cedex France; vol. RAN WG4, No. Qingdao, China; Jun. 27, 2017-Jun. 29, 2017; Jun. 26, 2017 (Jun. 26, 2017), XP051302606.
Huawei et al: "Initial consideration on UE measurement capabilities", 3GPP Draft; R4-1704988 Initial Consideration on UE Measurement Capabilities, 3rd Generation Partnership Project (3GPP), Mobile Competence Centre; 650, Route Des Lucioles; F-06921 Sophia-Antipolis CE; vol. RAN WG4, No. Hangzhou, China; May 15, 2017-May 19, 2017; May 14, 2017 (May 14, 2017), XP051277158.
Samsung: "Measurement gap for NR", 3GPP Draft; R2-1704484, 3rd Generation Partnership Project (3GPP), Mobile Competence Centre ; 650, Route Des Lucioles ; F-06921 Sophia-Antipolis Cedex France; vol. RAN WG2, No. Hangzhou, China; May 15, 2017-May 19, 2017; May 4, 2017 (May 4, 2017), XP051263597.
NTT Docomo, Inc.; "Discussion on RS design for NR RRM measurement"; 3GPP TSG RAN WG1 Meeting #88; R1-1702832; Feb. 3, 2017.
ETRI; "UE bandwidth configuration during initial access"; 3GPP TSG RAN WG1 NR Ad-Hoc#2; R1-1710622; Jun. 27, 2017.
Ericsson; "Configuration of measurement gap in NR"; 3GPP TSG-RAN WG2 #Adhoc 2; Tdoc R2-1707207; Jun. 27, 2017.

* cited by examiner

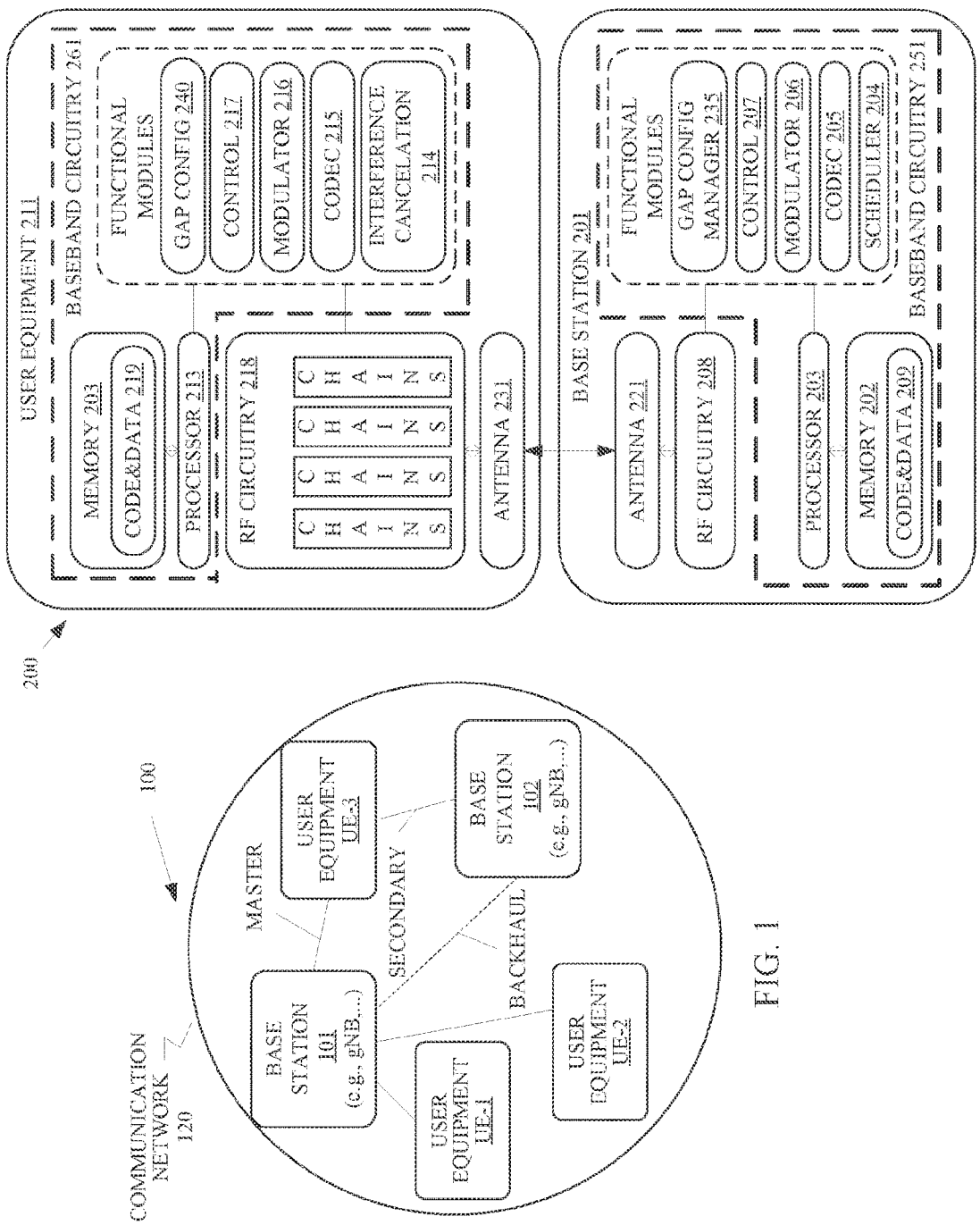

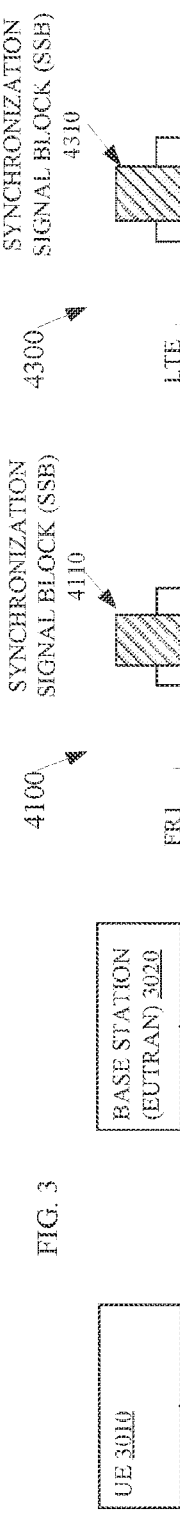
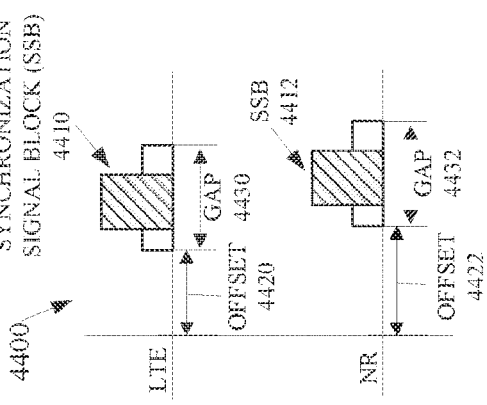
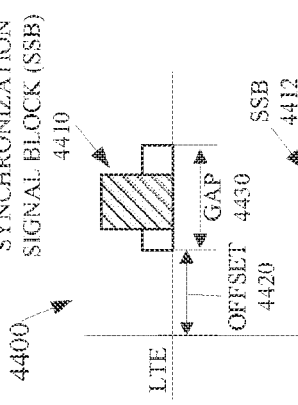
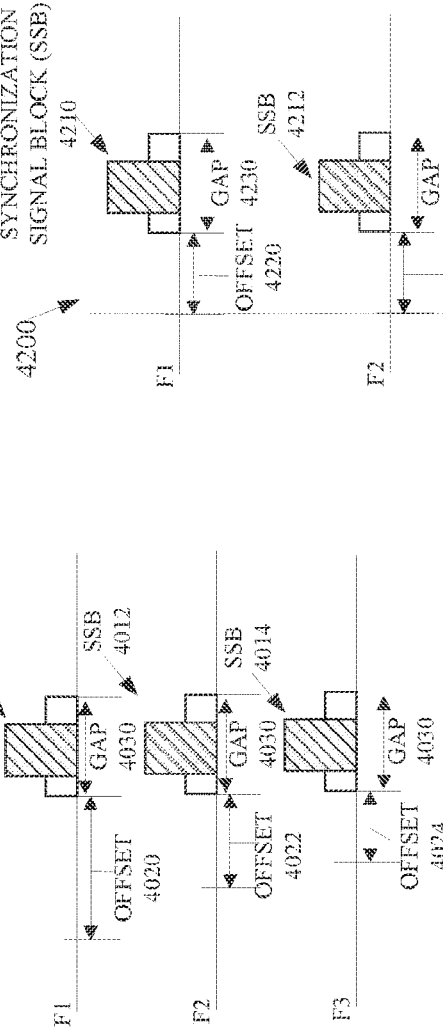

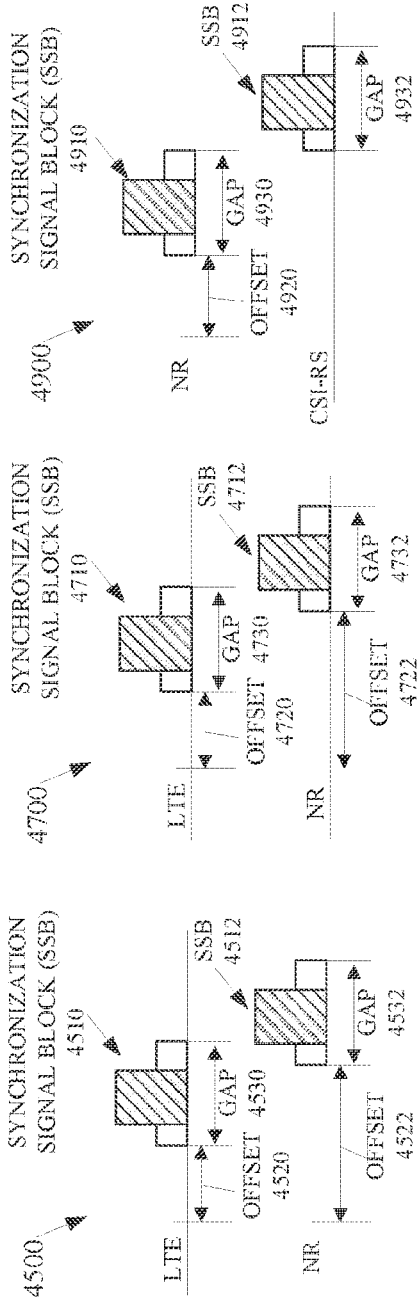
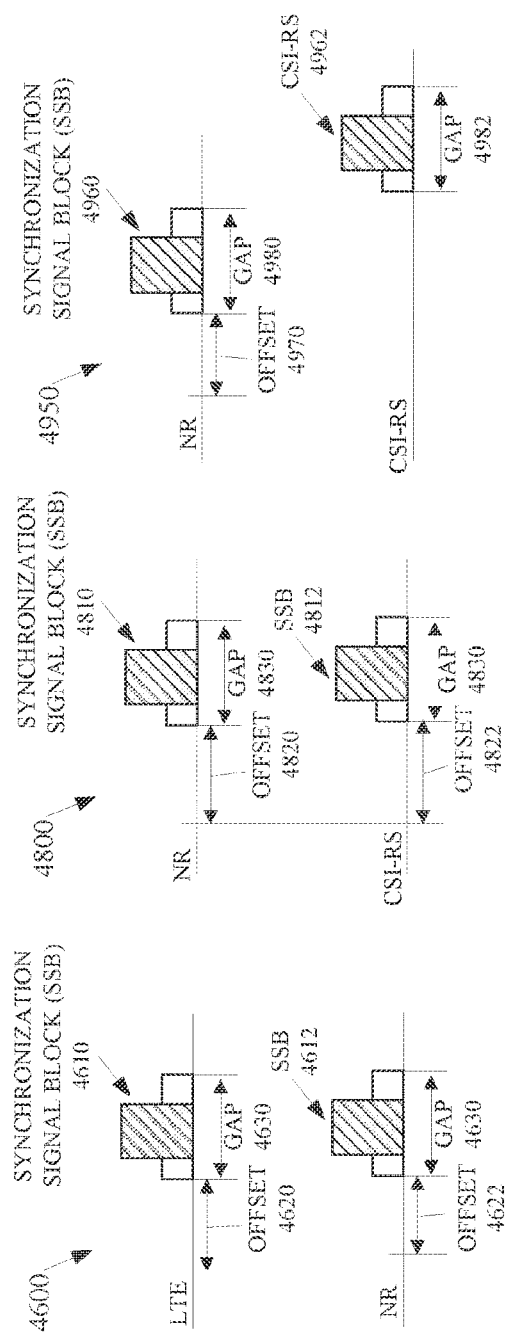

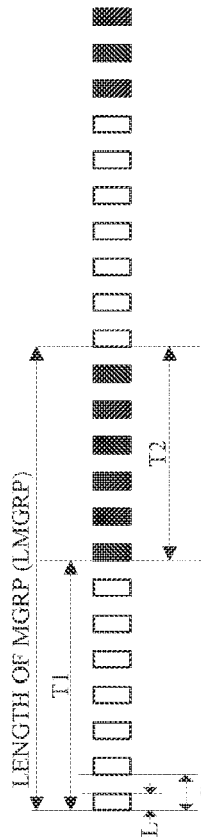
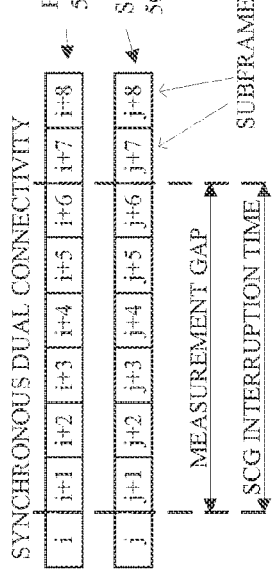
FIG. 5A
FIG. 5B
FIG. 5C
FIG. 5D

| Gap Pattern Id | MeasurementGap Length (MGL, ms) | Measurement Gap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 3 | 40 | 24$^{NOTE\,1,2}$ | Inter-Frequency E-UTRAN FDD and TDD for cells with time difference as specified below |
| 3 | 3 | 80 | 12$^{NOTE\,1,2}$ | Inter-Frequency E-UTRAN FDD and TDD for cells with time difference according as specified below |
| FFS: [4] | [6] | [20] | Note 3 | Intra-frequency NR and/or inter-RAT NR |
| [5] | 6 | 160 | Note 3 | Intra-frequency NR and/or inter-RAT NR |
| FFS: [6] | [4] | [20] | Note 3 | Intra-frequency NR and/or inter-RAT NR |
| [7] | 4 | 40 | Note 3 | Intra-frequency NR and/or inter-RAT NR |
| [8] | 4 | 80 | Note 3 | Intra-frequency NR and/or inter-RAT NR |
| [9] | [4] | [160] | Note 3 | Intra-frequency NR and/or inter-RAT NR |
| [10] | 3 | 20 | Note 3 | Intra-frequency NR and/or inter-RAT NR |
| [11] | 3 | 160 | Note 3 | Intra-frequency NR and/or inter-RAT NR |
| FFS: [12] | [5.5] | [20] | Note 3 | Intra-frequency NR and/or inter-RAT NR |
| [13] | [5.5] | 40 | Note 3 | Intra-frequency NR and/or inter-RAT NR |
| [14] | [5.5] | 80 | Note 3 | Intra-frequency NR and/or inter-RAT NR |
| [15] | [5.5] | 160 | Note 3 | Intra-frequency NR and/or inter-RAT NR |
| [16] | [3.5] | 20 | Note 3 | Intra-frequency NR and/or inter-RAT NR |
| [17] | [3.5] | 40 | Note 3 | Intra-frequency NR and/or inter-RAT NR |
| [18] | [3.5] | 80 | Note 3 | Intra-frequency NR and/or inter-RAT NR |
| [19] | [3.5] | 160 | Note 3 | Intra-frequency NR and/or inter-RAT NR |
| [20] | [1.5] | 20 | Note 3 | Intra-frequency NR and/or inter-RAT NR |
| [21] | [1.5] | 40 | Note 3 | Intra-frequency NR and/or inter-RAT NR |
| [22] | [1.5] | 80 | Note 3 | Intra-frequency NR and/or inter-RAT NR |
| [23] | [1.5] | [160] | Note 3 | Intra-frequency NR and/or inter-RAT NR |

NOTE 1: When determining UE requirements using Tinter1 for GP2 and GP3, Tinter1 = [60] for GP2 and Tinter1 = [30] for GP3 shall be used.
NOTE 2: This gap pattern is supported by UEs which support shortMeasurementGap-r14
NOTE 3: Editor's note:NR measurement requirement may not be scaled by Tinter

FIG. 5E

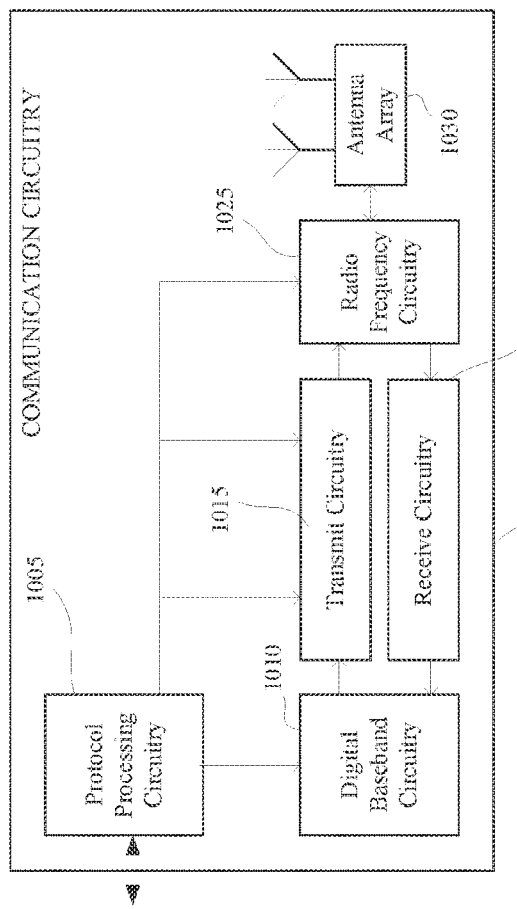
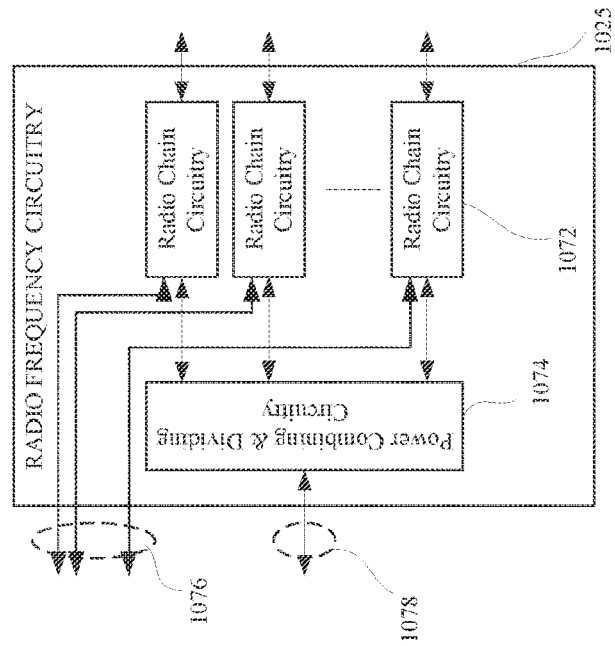
FIG. 10A
FIG. 10B

METHODS AND ARRANGEMENTS FOR MEASUREMENT GAP CONFIGURATION

CROSS REFERENCE TO RELATED APPLICATIONS

This application is a National Phase entry application of International Patent Application No. PCT/US2018/046351 filed Aug. 10, 2018, which claims priority to U.S. Provisional Application No. 62/543,711, entitled "MEASUREMENT GAP GROUPS FOR NEW RADIO (NR)", filed on Aug. 10, 2017, and is hereby incorporated by reference in its entirety.

TECHNICAL FIELD

Embodiments herein relate to wireless communications, and more particularly, to a radio resource management procedure for measurement gap configuration.

BACKGROUND

Radio resource management (RRM) is the system level management of co-channel interference, radio resources, and other radio transmission characteristics in wireless communication systems such as cellular networks, wireless local area networks, and wireless sensor systems. RRM involves strategies and algorithms for controlling parameters such as transmit power, user allocation, beamforming, data rates, handover criteria, modulation scheme, error coding scheme, etc. An objective of RRM is to utilize the limited radio-frequency spectrum resources and radio network infrastructure as efficiently as possible.

RRM focuses on multi-user and multi-cell network capacity issues, rather than the point-to-point channel capacity. When several users and adjacent base stations share the same frequency channel, efficient dynamic RRM schemes may increase the system spectral efficiency by an order of magnitude. RRM is especially important in systems limited by co-channel interference rather than by noise, for example cellular systems and broadcast networks homogenously covering large areas, and wireless networks consisting of many adjacent access points that may reuse the same channel frequencies.

BRIEF DESCRIPTION OF THE DRAWINGS

FIG. 1 depicts an embodiment of a system including a base station and user equipment interconnected via a communication network;

FIG. 2 depicts embodiments of a base station and user equipment, such as the base station and the user equipment illustrated in FIG. 1;

FIG. 3 depicts an embodiment of communications between a user equipment and a base station, such as the base station and user equipment shown in FIGS. 1 and 2;

FIGS. 4A-K depict embodiments of user equipment measurement gap configurations for a synchronization signal block, such as the user equipment shown in FIGS. 1 and 2;

FIGS. 5A-B depict embodiments of uniform or non-uniform measurement gaps and interruption time measurement in synchronous and asynchronous, dual connectivity for both a primary cell group and a secondary cell group for user equipment, such as the user equipment shown in FIGS. 1 and 2;

FIG. 5C depicts an embodiment of non-uniform measurement gaps for user equipment, such as the user equipment shown in FIGS. 1 and 2;

FIG. 5D depicts an embodiment of a table of non-uniform measurement gaps for user equipment indexed by a Gap Pattern identifier (ID) such as the non-uniform gaps illustrated in FIG. 5C;

FIG. 5E depicts an embodiment of a table of uniform measurement gaps for user equipment indexed by a Gap Pattern identifier (ID) such as the uniform gaps illustrated in FIGS. 5A-B;

FIGS. 10A-B depicts embodiments of communication circuitry such as the components and modules shown in the user equipment and base station in FIG. 2;

DETAILED DESCRIPTION OF EMBODIMENTS

Figure 6B:
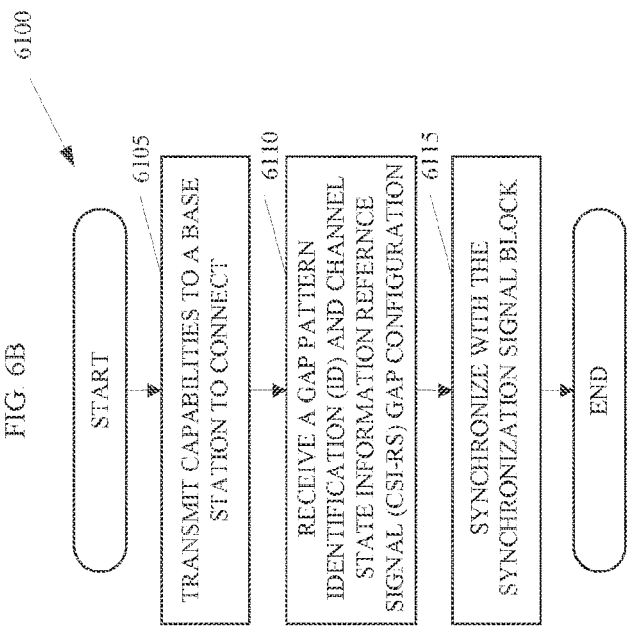
FIGS. 6A-B depict flowcharts of embodiments to determine a measurement gap configuration such as the measurement gap configurations described in conjunction with FIGS. 1-5E.

The following is a detailed description of embodiments depicted in the drawings. The detailed description covers all modifications, equivalents, and alternatives falling within the appended claims.

Dynamic RRM schemes adaptively adjust the radio network parameters to the traffic load, user positions, user mobility, quality of service requirements, base station density, etc. The design of wireless systems consider the dynamic RRM scheme with a view to minimize expensive manual cell planning and achieve "tighter" frequency reuse patterns between cells and within cells, resulting in improved system spectral efficiency.

In some embodiments, a Radio Network Controller (RNC) may control several base stations and access points to offer a centralized RRM schemes. Further embodiments offer distributed RRM schemes comprising either autonomous algorithms in mobile stations, base stations or wireless access points, or coordinated algorithms by exchanging information among these stations and access points.

Embodiments may define RRM requirements for a Node B's such as the evolved Node B (eNB) and the Next Generation Node B (gNB) as well as user equipment (UE) for Radio Access Networks (RANs) such as RAN2 and RAN4. RAN may be shorthand for E-UTRAN (Evolved Universal Terrestrial Radio Access Network) and the numbers 2 and 4 may represent the release numbers for the 3rd Generation Partnership Project (3GPP) E-UTRAN specifications.

Embodiments may configure measurement gaps for a 3GPP New Radio (NR). The NR may be co-existent with 3GPP Long Term Evolution (LTE) radios and may include beamforming for high frequencies such as frequencies above 6 gigahertz (GHz). Thus, configuration of measurement gaps is more complex than LTE. In particular, the existing LTE mechanism may not work for NRs because:

1. The NR in user equipment (UE) may need to beamform even for intra-frequencies so a measurement gap may be required for intra-frequencies.

2. The network may not be fully coordinate the New Radio Synchronization Signals (NR-SSs) so the NR-SSs are not fully aligned within a measurement gap length of 6 milliseconds for LTE radios. The NRs may require different measurement gap offsets for different cells within the same frequency layer or at a different frequency layer.

3. The channel state information reference signal (CSI-RS) is UE specific for NRs and may be configured in different time and frequency domains across different cells.

To illustrate, two frequency layers of an NR may have different starting points for synchronization signals. NR-SS. At the first frequency layer, the synchronization signal burst set may have a measurement gap offset of zero milliseconds (ms) from the start of the measurement gap and the synchronization signal burst set periodicity for frequency, F1, may be 20 ms. The measurement gap length for LTE may be 6 ms and the start of the synchronization signal burst set for the second frequency layer of the NR may have an offset of 5 ms from the start of the measurement gap. In many embodiments, the NR-SS has a duration that is longer than 1 ms due to, e.g., beamforming, so the current measurement gap configuration for LTE may not align with the second frequency layer of the NR in this example. More generally, the measurement gap configuration with a measurement gap length of 6 ins for LTE cannot align with both the first frequency layer and the second frequency layer of the NR in this example.

For this illustration, the first and the second frequency layers may require different offsets. However, the measurement gap configuration in LTE is UE specific and, thus, difficult to reuse.

Note that the RRM may assign a measurement gap offset of zero ms to one or more frequency layers or frequency ranges for which the synchronization signals (NR-SS) align with the measurement gap. In other frequency layers or ranges in the same cell and/or in other cells, the RRM determines an offset that will align the measurement gap with transmission of the synchronization signals (NR-SS). In particular, the RRM may cause a physical layer (PHY) of the base station to transmit one or more PHY packets to the UE that include an Radio Resource Control (RRC) layer protocol data unit (PDU) that comprises a measurement information element (IE) such as a McasGapConfig IE. The McasGapConfig IE may comprise a gapOffset field. The gapOffset field may comprise a value indicative of the measurement gap offset and may identify a subframe of a system frame number (SFN), which identifies the start of the measurement gap to the RRM of the UE for a frequency layer or range. In many embodiments, the MeasGapConfig IE may comprise a servCellId field to identify one or more cells associated with the measurement gap configuration.

Several embodiments herein describe (1) measurement gap configurations for NRs, (2) measurement gap configurations for an NR that coexist with an LTE radio, (3) measurement gap configurations for an NR that coexists with an LTE radio when dual connectivity (DC) is configured, and/or (4) measurement gap configurations for channel state information reference signals for NRs.

Assume that 6 ins is the measurement gap length (MGL) for NRs as a baseline for NR-SS block-based cell measurement. The NR-SS block may comprise a primary synchronization signal (PSS), a secondary synchronization signal (SSS), and, in some embodiments, a channel state information reference signal (CSI-RS). In LTE, a 1 ms measurement is enough, however, beamforming used in NRs may require longer than 1 ms measurement for all NR SS blocks. Therefore, an accurate starting time of the SS burst set may ensure measurement is performed for the entire duration of the NR SS burst set. Furthermore, different frequency layers may have different starting points of the NR SS burst set. Thus, many embodiments require the network to configure a different measurement gap offset per frequency and hence multiple measurement gaps for different offset groups.

A first set of embodiments may comprise a measurement gap configuration for the NR that includes a single measurement gap per UE with multiple measurement gap offsets. The measurement gap offsets may be per frequency configuration and/or per cell configuration. In other words, if the cells are fully synchronized, the measurement gap configuration may include an offset per frequency layer along with the single measurement gap. In such embodiments, the network may ensure that the offset(s) of each cell will work with the single measurement gap. If the cells are not fully synchronized, the measurement gap configuration may include an offset per frequency layer per cell with the single measurement gap per cell. Note that "measurement gap" as discussed in this disclosure includes a measurement gap length (MGL) such as the 6 ms length discussed above, a measurement gap repetition period (MGRP) such as 20 ms such as the SS burst set periodicity discussed above, and a gap pattern. Furthermore, the "measurement gap configuration" may comprise one or more measurement gaps and one or more measurement gap offsets.

A second set of embodiments may comprise one measurement gap per offset frequency group and, in some of these embodiments, per cell group. The RRM of network may configure multiple measurement gaps for the UE for different cell and/or frequency measurements. For instance, the RRM may group the frequency layers into frequency ranges (FRs) and determine an offset and single measurement gap for the NR SS block for each of the FRs. As an example, the RRM may set Offset 1 for a first frequency range that includes F1, F2, and F3, and set Offset 2 for a second frequency range that includes F4 and F5. In a further example, the RRM may group all low frequency range (below 6 GHz) frequency layers as the first frequency range with the offset 1 and all high frequency range (above 6 GHz) frequency layers as the second frequency range with the offset 2. The RRM may then configure a measurement gap repetition period (MGRP) at 80 ms with offset 1 for the UE and 80 ms with offset 2 for the UE. Furthermore, if NR and LTE cells are not fully synchronized, the RRM may assign different measurement configurations for the UE per cell. In one embodiment, one or more frequency ranges such as FR1 may represent an LTE frequency range and a low frequency range for the NR and FR2 may represent a high frequency range for the NR.

In a third set of embodiments, the RRM may, if cells are fully synchronized, determine a measurement configuration with a single measurement gap and a single measurement gap offset per UE. For example, the RRM may determine an SSB offset of 1 ms and a measurement gap configuration with an MGL of 6 ms and an MGRP of 40 ms, Due to multi-Radio Access Technology (multi-RAT) measurement, the UE may need to perform both NR and LTE measurement. The MGL of 6 ms may cover at least 1 primary synchronization signal (PSS) or secondary synchronization signal (SSS), so it is possible to have a single measurement gap configuration for both LTE and NR.

In a fourth set of embodiments, the RRM may determine a single measurement gap configuration for both LTE frequency layers and NR frequency layers. In other such embodiments, the RRM may determine measurement gap configurations for both LTE frequency layers and NR frequency layers independently.

In a fifth set of embodiments, the RRM may determine a single measurement gap configuration for LTE and a separate measurement gap configuration for NR. In such embodiments, the UE can utilize different radio frequencies (RFs) to realize a higher data rate if the LTE and NR frequencies are separate and far enough apart that the UE can use them simultaneously.

In a sixth set of embodiments, the UE is capable of dual connectivity (DC). The UE may associate via LTE with a Master next generation Node B (MgNB) and may associate via NR with a secondary next generation Node B (SgNB). The RRM may determine a measurement gap configuration in accordance with two or more options. In accordance with a first option, the RRM of the MgNB and SgNB may coordinate and either the MgNB or the SgNB may then assign one single measurement gap to the UE for both the LTE and the NR frequency layers. In accordance with a second option, the RRM of the MgNB configures measurement gap on an LTE/NR frequencies where the NR frequencies overlap with LTE frequencies (i.e., below 6 GHz) and the SgNB configures a measurement gap on the higher NR frequencies (i.e., 6 GHz and above). Thereafter, the MgNB and SgNB may communicate to exchange measurement results. In some embodiments, the MgNB and SgNB may have individual reporting configurations.

A seventh set of embodiments may address measurement gaps for channel state information reference signal (CSI-RS) measurement for an NR of a UE. For a CSI-RS measurement, since the UE will be configured via dedicated signal and CSI-RS is UE specific, the measurement gap configuration can have several options. In a first option, the CSI-RS may share the same measurement gap as NR-SS. In a second option, the network may determine a separate measurement gap only for the CSI-RS. And, in a third option, the network may determine the exact gap within which to transmit the CSI-RS based on CSI-RS resources configured by the network. In other words, the RRM of a Node B of a cell associated with the UE may determine a single, non-periodic measurement gap for transmission of the CSI-RS rather than a periodic measurement gap.

Once the UE is in the radio resource control (RRC) layer connected state, monitoring of all the frequency layers may involve monitoring E-UTRA intra frequency, E-UTRA inter frequency, Inter-Radio Access Technology (Inter-RAT) UTRA Frequency Division Duplex (FDD), UTRA Time Division Duplex (TDD), and Global System for Mobile communication (GSM) measurements that are applicable to the UE. Many embodiments have configured measurement types such as Primary Common Control Physical Channel (P-CCPCH), Received Signal Code Power (RSCP), Common Pilot Channel (CPICH) measurements. High Rate Packet Data (HRPD), Code Division Multiple Access (CDMA). Global Navigational Satellite System (GSM) carrier Received Signal Strength Indicator (RSSI). Reference Signal Received Power (RSRP), Reference Signal Received Quality (RSRQ), Reference Signal Received Power (RSTD), Reference Signal-Signal to Noise and Interference Ratio (RS-SINR). New Radio Synchronization Signal-Reference Signal Received Power (NR SS-RSRP). New Radio Synchronization Signal-Reference Signal Received Quality (NR SS-RSRQ), and New Radio Synchronization Signal-Signal to Noise and Interference Ratio (NR SS-SINR). The RRC layer connected state is an initial connection between a UE and a base station in which the RRC layer of the base station connects with the RRC layer of the UE.

For RANs, the base station may execute code and protocols for E-UTRA (Evolved Universal Terrestrial Radio Access), an air interface for base stations and interaction with other devices in the E-UTRAN such as UE. The E-UTRA may include the radio resource management (RRM) in a radio resource control (RRC) layer and the RRM may determine, assign, and schedule the measurement gap configurations for a UE by transmitting, to the UE, measurement gap configurations in an RRC layer information element (IE) via one or more medium access control (MAC) layer Service Data Units (MSDUs) encapsulated in one or more Physical layer (PHY) radio frames. In some embodiments, the RRM may indicate with the measurement gap configuration, a gap pattern, periodicity, and duration for a measurement gap to the UE via the RRC layer.

In several embodiments, the RRM may communicate with a UE to receive signaling from the UE that indicates the measurement gap capabilities of the UE and may determine a gap pattern for measurement gaps based on the capabilities of the UE. For instance, the RRM may look up a set of measurement gaps based on the capabilities of the UE in a table or list in memory.

As part of the E-UTRAN, the UE may implement one or more protocols related to the measurement gap configuration. For instance, the MAC layer may not transmit or receive any data during the measurement gaps. In some embodiments, a receiver of the UE is not expected to tune to a carrier frequency related to the E-UTRAN protocols of a PCell (Primary Cell) and any SCell (Secondary Cell). Furthermore, if the UE supports dual connectivity (DC) and is configured with a PSCell (Primary Secondary Cell), during the total interruption time, the UE may not transmit and receive any data in a Secondary Cell Group (SCG). Further still, in the uplink subframe occurring immediately after a measurement gap, the UE may determine whether the UE can transmit data if all the serving cells belong to E-UTRAN Time Division Duplex (TDD) and if the subframe occurring immediately before the measurement gap is an uplink subframe. Otherwise, the UE may not transmit any data.

The PCell is the cell operating on the primary frequency in which the UE either performs the initial connection establishment procedure or initiates the connection re-establishment procedure. The procedure may connect the UE with the RRC of a base station, or the cell indicated as the primary cell in the handover procedure between base stations or Radio Access Technologies (RATs). The SCell is a cell operating on a secondary frequency, which may be configured once an RRC connection is established and which may be used to provide additional radio resources and/or for load balancing between base stations. For a UE configured with dual connectivity (DC), the subset of serving cells that are not part of the Master Cell Group (MCG), and that comprise the PSCell and zero or more other secondary cells is referred to as the Secondary Cell Group (SCG). Furthermore, a PSCell is the SCG cell in which the UE is instructed to perform random access or initial Physical Uplink Shared Channel (PUSCH) transmission if random access procedure is skipped when performing an SCG change procedure.

Cells generally refer to the geographic location serviced by a base station such as an eNB and/or a gNB. Each cell is associated with an ID to uniquely identify cells, at least within the local area, and cells have various sizes that may depend of the radio coverage of the base station that services the cell.

Various embodiments may be designed to address different technical problems associated with measurement gap configuration for new radios (NRs) such as determining measurement gaps for multiple NR frequency layers or frequency ranges, determining measurement gaps for a channel state information reference signal, determining measurement gaps for coexisting LTE frequency layers, determining measurement gaps for dual connectivity of NR frequency layers and one or more LTE frequency layers, determining measurement gap offsets for NR frequency layers or frequency ranges, determining a single measurement gap for the NR frequency layers or range and the CSI-RS, determining a single measurement gap for NR and LTE frequency layers, and/or the like.

Different technical problems such as those discussed above may be addressed by one or more different embodiments. Embodiments may address one or more of these problems associated measurement gap configurations for NR frequency layers. For instance, some embodiments that address problems associated with measurement gap configurations for NR frequency layers may do so by one or more different technical means, such as, decoding, by baseband logic circuitry, uplink data for an initial communication from a user device, wherein the initial communication comprises capabilities: determining, by the baseband logic circuitry, based on an indication of a capability to support new radio frequency layers from the capabilities for the user device, a measurement gap configuration for the new radio frequency layers and for a channel state information reference signal (CSI-RS); sending, by the baseband logic circuitry via an interface, a frame with a preamble to a physical layer, the frame comprising the measurement gap configuration; determining a measurement gap configuration to support new radio frequency layers for the user device for a cell that is independent of measurement gap configuration to support new radio frequency layers of other user devices for the cell: determining a measurement gap configuration to support new radio frequency layers for the user device for a cell that is independent of measurement gap configuration to support new radio frequency layers for the user device for a different cell; wherein the measurement gap configuration comprises a measurement gap for each of the new radio frequency layers for the user device; wherein the measurement gap configuration comprises a measurement gap for each of the new radio frequency layers for the user device per cell associated with the user device: wherein the measurement gap configuration comprises a measurement gap for more than one frequency range of the new radio frequency layers for the user device; wherein the measurement gap configuration comprises a measurement gap for more than one frequency range of the new radio frequency layers for the user device per cell associated with the user device; wherein the measurement gap configuration comprises a single measurement gap for both the new radio frequency layers for the user device and one or more Long Technology Evolution (LTE) frequency layers for the user device; wherein the measurement gap configuration comprises a single measurement gap for the new radio frequency layers for the user device and a separate measurement gap for one or more Long Technology Evolution (LTE) frequency layers for the user device: wherein the measurement gap configuration comprises a single, periodic measurement gap for the CSI-RS shared with a new radio synchronization signal for the new radio frequency layers; wherein the measurement gap configuration comprises a periodic measurement gap for the channel state information reference signal that is separate from a periodic measurement gap for the new radio frequency layers for the user device; wherein the measurement gap configuration comprises a single, non-periodic measurement gap for the channel state information reference signal; and/or the like.

Several embodiments comprise systems with multiple processor cores such as central servers, access points, and/or stations (STAs) such as modems, routers, switches, servers, workstations, netbooks, mobile devices (Laptop, Smart Phone. Tablet, and the like), sensors, meters, controls, instruments, monitors, home or office appliances. Internet of Things (IoT) gear (watches, glasses, headphones, cameras, and the like), and the like. Some embodiments may provide. e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), 3GPP LTE-Advanced (LTE-A), 4G LTE, and/or 5G New Radio (NR), technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX H, Code Division Multiple Access (CDMA) 2000 (e.g., CDMA2000 1×RTT, CDMA200) EV-DO, CDMA EV-DV, and so forth), High Performance Radio Metropolitan Area Network (HIPERMAN), Wireless Broadband (WiBro). High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad. IEEE 802.11ae, IEEE 802.11af, IEEE 802.11ah, IEEE 802.11ai, IEEE 802.11-2016 and/or standards. High-Efficiency Wi-Fi standards developed by the IEEE 802.11 High Efficiency WLAN (HEW) Study Group. Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, 3GPP TS 23.682, 3GPP TS 36.133, 3GPP TS 36.306, 3GPP TS 36.321, 3GPP TS.331, 3GPP TS 38.133, 3GPP TS 38.306, 3GPP TS 38.321, and/or 3GPP TS 38.331, and/or near-field communication (NFC) standards such as standards developed by the NFC Forum, including any revisions, progeny, and/or variants of any of the above. The embodiments are not limited to these examples.

FIG. 1 illustrates a communication network 120 to measurement gap configuration for new radios (NRs). The communication network 100 is an Orthogonal Frequency Division Multiplex (OFDM) network comprising a primary base station 101, a first user equipment UE-1, a second user equipment UE-2, a third user equipment UE-3, and a secondary base station 102. In a 3GPP system based on an Orthogonal Frequency Division Multiple Access (OFDMA) downlink, the radio resource is partitioned into subframes in time domain and each subframe comprises of two slots. Each OFDMA symbol further consists of a count of OFDMA subcarriers in frequency domain depending on the system bandwidth. The basic unit of the resource grid is called Resource Element (RE), which spans an OFDMA subcarrier over one OFDMA symbol. Resource blocks (RBs) comprise a group of REs, where each RB may comprise. e.g., 12 consecutive subcarriers in one slot.

Several physical downlink channels and reference signals use a set of resource elements carrying information originating from higher layers of code. For downlink channels, the Physical Downlink Shared Channel (PDSCH) is the main data-bearing downlink channel, while the Physical Downlink Control Channel (PDCCH) may carry downlink control information (DCI). The control information may include scheduling decision, information related to reference signal information, rules forming the corresponding transport block (TB) to be carried by PDSCH, and power control command. UEs may use cell-specific reference signals (CRS) for the demodulation of control/data channels in non-precoded or codebook-based precoded transmission modes, radio link monitoring and measurements of channel state information (CSI) feedback. UEs may use UE-specific reference signals (DM-RS) for the demodulation of control/data channels in non-codebook-based precoded transmission modes.

The communication network 120 may comprise a cell such as a micro-cell or a macro-cell and the base station 101 may provide wireless service to UEs within the cell. The base station 102 may provide wireless service to UEs 110 within another cell located adjacent to or overlapping the cell. In other embodiments, the communications network 120 may comprise a macro-cell and the base station 102 may operate a smaller cell within the macro-cell such as a micro-cell or a picocell. Other examples of a small cell may include, without limitation, a micro-cell, a femto-cell, or another type of smaller-sized cell.

In various embodiments, the base station 101 and the base station 102 may communicate over a backhaul. In some embodiments, the backhaul may comprise a wired backhaul. In various other embodiments, backhaul may comprise a wireless backhaul. In some embodiments, the base stations 101 and 102 may coordinate via the backhaul or by other communication methods to determine measurement gap configurations for UEs such as UE-1, UE-2, and UE3 and, in several embodiments, to communicate or transmit the measurement gap configurations to the UEs. For example, the base station 101 may comprise an LTE based gNB and the base station 102 may comprise a NR based gNB. The UE-1 may comprise baseband circuitry with capabilities of dual connectivity of both NR frequencies and one or more LTE frequencies.

Upon the initial connection by the UE with the base station 101, between the radio resource control (RRC) layer of the base station 101 and the UE-1, the UE-1 may transmit signaling such as an initial communication comprising an information element that includes capabilities information about the UE-1 indicating the capabilities of dual connectivity of NR frequencies and one or more LTE frequencies. The base station 101 may coordinate with the base station 102 to coordinate measurement gap configuration for the UE-1. In one embodiment, an RRM of the base station 101 may coordinate with an RRM of the base station 102 to determine whether the base station 101 or the base station 102 will determine and/or transmit the measurement gap configuration to the UE-1. In some embodiments, the base stations 101 and 102 may fully synchronize or coordinate measurement gaps for various frequency layers of the LTE radio and the NR radio and the base station 101 or the base station 102 may transmit a single measurement gap to the UE-1 for frequency layers of both the LTE radio and the NR radio.

The base station 101 or the base station 102 may transmit a single measurement gap to the UE-1 in the form of a gap pattern identification (ID) such as the gap patterns the tables 5300 and 5400 in FIGS. 5D-E. The gap pattern ID may describe a measurement gap length (MGL), a measurement gap repetition period (MGRP), and a measurement gap pattern.

In other embodiments, the base stations 101 and 102 may not fully coordinate or synchronize and each base station 101 and 102 may independently configure measurement gaps NR and LTE frequency layers for the UE-1. In such embodiments, the base stations 101 and 102 may share measurement data from the UE-1 via, e.g., the backhaul or via another communication method.

FIG. 2 is a simplified block diagram 200 of a base station 201 and a user equipment (UE) 211 that may carry out certain embodiments of the present invention in a communication network such as the base station 101, the UEs, and communication network 120 shown in FIG. 1. For the base station 201, the antenna 221 transmits and receives radio signals. The RF circuitry 208 coupled with the antenna 221, which is the physical layer of the base station 201, receives RF signals from the antenna 231, converts the signals to digital baseband signals, or uplink data, and sends them to the processor 203 of the baseband circuitry 251, also referred to as the processing circuitry or baseband processing circuitry, via an interface of the baseband circuitry 251. The RF circuitry 208 also converts received, digital baseband signals, or downlink data, from the processor 203 via an interface of the baseband circuitry 251, converts them to RF signals, and sends the RF signals out to antenna 221.

The processor 203 decodes and processes the digital baseband signals, or uplink data, and invokes different functional modules to perform features in the base station 201. The memory 202 stores program instructions or code and data 209 to control the operations of the base station. The processor 203 may also execute code such as RRC layer code from the code and data 209 to configure and implement the gap configuration manager 235 to determine and cause to transmit measurement gap configurations to UEs such as the UE 211.

The RRC layer code, when executed on a processor such as the processor 203, may determine that the UE 211 requires an NR measurement gap configuration based on capabilities that the UE 211 transmits to the base station 201. The RRC layer code may look up a gap pattern ID for an NR for the UE 211 based on capabilities indicated by the UE 211 in a table such as the table 5300 for non-uniform gap patterns illustrated in FIG. 5D or the table 5400 for uniform gap patterns in FIG. 5E.

After identifying a gap pattern for the UE 211, the RRC layer code may also determine how to coordinate the measurement gap for multiple NR frequency layers and transmit an information element to the UE 211 that includes measurement gap configuration. For example, the RRC layer code may determine to assign a measurement gap configuration comprising a measurement gap and a measurement gap offset, also referred to herein as an "offset", for each frequency layer of the NR or for two or more frequency ranges of the NR.

Thereafter, the gap configuration manager 235 may enforce radio resource management (RRM) protocols such as when the UE 211 is not expected to transmit any data or tune its receiver to any of the E-UTRAN carrier frequencies like component carrier frequencies of the PCell, the PSCell, and the SCell. For instance, during a measurement gap, the gap configuration manager 235 may not schedule traffic data, or may delay scheduling traffic data, received for transmission to the UE 211 until a subframe after the measurement gap such as a first downlink subframe immediately after the end of the measurement gap.

In some embodiments, the base station 201 may communicate with a secondary base station that communicates with the UE 211, information about an assignment for measurement gap to the UE 211 so that a gap manager of the secondary base station may enforce RRM protocols related to measurement gaps for the UE 211.

A similar configuration exists in UE 211 where the antenna 231 transmits and receives RF signals. The RF circuitry 218, coupled with the antenna, receives RF signals from the antenna 221, converts them to baseband signals, or downlink data, and sends them to processor 213 of the baseband circuitry 261 via an interface of the baseband circuitry 261. The RF circuitry 218 also converts digital baseband signals, or uplink data, from the processor 213, converts them to RF signals, and sends out the RF signals to the antenna 231.

The RF circuitry 218 illustrates multiple RF chains. While the RF circuitry 218 illustrates five RF chains, each UE may have a different number of RF chains and each of the RF chains in the illustration may represent multiple, time domain, receive (RX) chains and transmit (TX) chains. The RX chains and TX chains include circuitry that may operate on or modify the time domain signals transmitted through the time domain chains such as circuitry to insert guard intervals in the TX chains and circuitry to remove guard intervals in the RX chains. For instance, the RF circuitry 218 may include transmitter circuitry and receiver circuitry, which is often called transceiver circuitry. The transmitter circuitry may prepare digital data from the processor 213 for transmission through the antenna 231. In preparation for transmission, the transmitter may encode the data, and modulate the encoded data, and form the modulated, encoded data into Orthogonal Frequency Division Multiplex (OFDM) and/or Orthogonal Frequency Division Multiple Access (OFDMA) symbols. Thereafter, the transmitter may convert the symbols from the frequency domain into the time domain for input into the TX chains. The TX chains may include a chain per subcarrier of the bandwidth of the RF chain and may operate on the time domain signals in the TX chains to prepare them for transmission on the component subcarrier of the RF chain. For wide bandwidth communications, more than one of the RF chains may process the symbols representing the data from the baseband processor(s) simultaneously.

The processor 213 decodes and processes the digital baseband signals, or downlink data, and invokes different functional modules to perform features in the UE 211. The memory 212 stores program instructions or code and data 219 to control the operations of the UE 211. The processor 213 may also execute medium access control (MAC) layer code of the code and data 219 such as the functional module, gap configuration 240, to implement measurement gap configurations for the UE 211. For instance, the MAC layer code may execute on the processor 213 to perform measurements on signals and to cause measurement reports to transmit to the base station 201 via one or more of the RF chains of the physical layer (PHY). The PHY is the RF circuitry 218 and associated logic such as the functional module, gap configuration 240.

To illustrate for E-UTRAN FDD intra frequency measurements, the UE 211 may be able to identify new intra-frequency cells and perform RSRP. RSRQ, and RS-SINR measurements of identified intra-frequency cells without an explicit intra-frequency neighbour cell list containing physical layer cell identities. During the RRC_CONNECTED state the UE 211 may continuously measure identified intra frequency cells and additionally search for and identify new intra frequency cells. Furthermore, in the RRC_CONNECTED state, the measurement period for intra frequency measurements may be, e.g., 200 milliseconds (ms). When no measurement gaps are activated, the UE 211 may be capable of performing RSRP, RSRQ, and RS-SINR measurements for 8 identified-intra-frequency cells, and the UE 211 physical layer may be capable of reporting measurements to higher layers with the measurement period of, e.g., 200 ms.

The base station 201 and the UE 211 may also include several functional modules and circuits to carry out some embodiments. The different functional modules may include circuits or circuitry that code, hardware, or any combination thereof, can configure and implement. Each functional module that can implement functionality as code and processing circuitry or as circuitry configured to perform functionality, may also be referred to as a functional block. For example, the processor 203 (e.g., via executing program code 209) is a functional block to configure and implement the circuitry of the functional modules to allow the base station 201 to schedule (via scheduler 204), encode (via codec 205), modulate (via modulator 206), and transmit control information and data (via control circuit 207) to the UE 211.

The processor 213 (e.g., via executing program code 219) may be a functional block to configure and implement the circuitry of the functional modules to allow the UE 211 to receive, de-modulate (via de-modulator 216), and decode (via codec 215) the control information and data (via control circuit 217) accordingly with an interference cancelation (IC 214) capability.

FIG. 3 depicts an embodiment of communications between user equipment 3010 and a base station 3020, such as the base station and user equipment shown in FIGS. 1 and 2. In the present embodiment, the base station 3020 may transmit a UE capability enquiry message 3030 to the UE 3010 to request capability information. The UE 3010 may respond to the request with a UE capability information message 3040 and, based on the capability information, the base station 3020 may transmit a measurement configuration message 3050 that includes a measurement gap configuration such as one or mom of the measurement gap configurations described in conjunction with FIGS. 4A-K. For instance, the base station 3020 may detect the UE 3010 and request the capability information so that the base station 3020 can determine which features should be enabled or disabled as well as other configurations.

FIGS. 4A-K illustrate embodiments of measurement gap configurations determined by a base station for a UE, for a new radio (NR), an NR for a cell in which NR and LTE coexist, an NR with dual connectivity (DC) capabilities, and channel state information reference signals of an NR, such as the base station and the UE discussed in conjunction with FIGS. 1-3. FIG. 4A depicts a first embodiment 4000 of a measurement gap configuration for a UE for three frequency layers of an NR. The measurement gap configuration for the NR may include a single measurement gap 4030 per UE with multiple measurement gap offsets 4020, 4022, and 4024. Each measurement gap 4030 may comprise a measurement gap length (MGL) such as 6 ms and a periodicity such as 5 ms, 10 ms, 20 ms, 40 ms, 80 ms, or 160 ms. Assignment of the single measurement gap 4030 per UE indicates that the RRM assigns the same MGL and the same periodicity for each frequency layer of the NR. In some embodiments, assignment of the single measurement gap 4030 to each frequency layer involves assignment of the same gap pattern identification (ID) to each frequency layer such as the gap pattern IDs described in table 5300 of FIG. 5D and table 5400 of FIG. 5E.

The measurement gap configuration may assign multiple measurement gap offsets 4020, 4022, and 4024 per frequency configuration and, in some embodiments, per cell configuration. In other words, if cells are fully synchronized, the measurement gap configuration may include an offset 4020, 4022, and 4024 per frequency layer F1, F2, and F3, respectively, along with the single measurement gap 4030. In such embodiments, the RRM may ensure that the same offset(s) for frequency layers of each cell coordinate with the single measurement gap 4030 to ensure that the synchronization signal blocks (SSBs) 4010, 4012, and 4014 of each frequency layer F1, F2, and F3 fall within the MGL of the single measurement gap 4030 in each cell. Note that the RRM of fully synchronized cells also coordinate transmission of synchronization signal blocks (SSBs) 4010, 4012, and 4014 by a Node B (gNB or eNB) of each cell to fall within the measurement gap 4030 at each frequency layer F1, F2, and F3.

If the cells are not fully synchronized, the measurement gap configuration shown may be per cell identification (ID) so each cell may have a different MGL, a different periodicity, different offsets, and/or a different gap pattern. Furthermore, the illustration of three frequency layers may illustrate one embodiment. Other embodiments may include more than three frequency layers or less than three frequency layers.

FIG. 4B depicts a second embodiment 4100 of a measurement gap configuration for a UE for two frequency ranges (FR1 and FR2) of frequency layers of an NR. The measurement gap configuration for the NR may include a single measurement gap and a single offset per frequency range such as the measurement gap 4130 and the offset 4120 for the frequency range, FR1. Also, the measurement gap configuration may include the single measurement gap 4132 and offset 4122 for the frequency range, FR2. In such embodiments, the measurement gaps 4130 may align with the SSB 4110 for each frequency layer in the frequency range FR1. Similarly, the measurement gaps 4132 may align with the SSB 4112 for each frequency layer in the frequency range FR2.

If the cells associated with the UE, such as NR and LTE cells, are fully synchronized, the RRM may assign the same measurement gap configurations for the UE for each cell. If the cells associated with the UE are not fully synchronized, the RRM may assign different measurement gap configurations for the UE for each cell. For example, FR1 may represent an LTE frequency range and a low frequency range for the NR such as sub 6 GHz frequencies and FR2 may represent a high frequency range for the NR such as 6 GHz or above. The master cell associated with the UE may be an LTE cell such as a first gNB and a secondary cell associated with the UE may be an NR cell such as a second gNB. If the first gNB and the second gNB are fully synchronized such that the measurement gaps in the frequency layers of FR1 and FR2 of the first gNB align with the measurement gaps in the frequency layers of FR1 and FR2 of the second gNB, respectively, the RRM may assign a single gap and offset per frequency range. On the other hand, if the cells are not fully synchronized, the RRM may assign a single gap and offset per frequency range per cell. Other embodiments may include more than two frequency groups. Note also that the measurement gaps 4130 and 4132 are periodic and may have the same or different periods of MGRPs such as 5 ms, 10 ms, 20 ms, 40 ms, 80 ms, and 160 ms.

FIG. 4C depicts a third embodiment 4200 of a measurement gap configuration for a UE for two frequency layers of an NR. The measurement gap configuration for the NR may include a single measurement gap and a single offset such as the measurement gap 4230 and the offset 4220 for both frequency layers. F1 and F2. In such embodiments, the measurement gaps 4230 may align with the SSB 4210 and SSB 4212 in both frequency layers, F1 and F2. Other embodiments may include mot than two frequency layers. Note also that the measurement gap 4230 is periodic and has a period of MGRP such as 5 ms, 10 ms, 20 ms, 40 ms, 80 ms, and 160 ms.

FIG. 4D depicts a fourth embodiment 4300 of a measurement gap configuration for a UE for an LTE frequency range and an NR frequency range. The measurement gap configuration for the NR may include a single measurement gap 4330 for both the LTE frequency range and the NR frequency range. In many embodiments, the offsets 4320 and 4322 may be different to align the measurement gap 4330 to receive the SSBs 4310 and 4312, respectively. Note that the measurement gap 4330 is periodic and has a period of MGRP such as 5 ms, 10 ms, 20 ms, 40 ms, 80 ms, and 160 ms. Note also that while the fourth embodiment 4300 illustrates receipt of the SSBs 4310 and 4312 simultaneously, the SSBs may not align exactly and, in some embodiments, the RRM may transmit the SSB 4310 and the SSB 4312 at alternating, or otherwise, different repetitions of the measurement gap 4330.

FIG. 4E depicts an alternative, fourth embodiment 4400 of a measurement gap configuration for a UE for an LTE frequency range and an NR frequency range. The measurement gap configuration for the NR frequency range may include a first measurement gap 4430 and the measurement gap configuration for the LTE frequency range may include a second measurement gap 4432. In many embodiments, the offsets 4320 and 4322 may be different to align the measurement gap 4330 to receive the SSBs 4310 and 4312, respectively. For example, the UE may be capable of dual connectivity (DC) and a primary cell, or master cell, for the UE may transmit on LTE frequencies and a secondary cell of the UE may transmit on NR frequencies.

Note that the measurement gap 4330 is periodic and has a period of MGRP such as 5 ms, 10 ms, 20 ms, 40 ms, 80 ms, and 160 ms. In some embodiments, the offsets 4420 and 4422 for the NR frequency range and the LTE frequency range may differ. In other embodiments, the offsets 4420 and 4422 for the NR frequency range and the LTE frequency range are the same and do not differ.

FIG. 4F depicts a fifth embodiment 4500 of a first measurement gap configuration for a UE for an LTE frequency range and a second measurement gap configuration for a UE for an NR frequency range. The RRM may determine a first measurement gap 4530 and offset 4520 for the LTE frequency range and may determine a second measurement gap 4532 and offset 4522 for the NR frequency range. In many embodiments, the offsets 4520 and 4522 may align the measurement gaps 4530 and 4532 with the SSBs 4510 and 4512, respectively. Note that the measurement gaps 4530 and 4532 are periodic and have a repetition period of MGRP such as 5 ms, 10 ms, 20 ms, 40 ms, 80 ms, and 160 ms. In some embodiments, the offsets 4520 and 4522 for the NR frequency range and the LTE frequency range may differ. In other embodiments, the offsets 4520 and 4522 for the NR frequency range and the LTE frequency range are the same and do not differ.

FIG. 4G depicts a sixth embodiment 4600 of measurement gap configuration for UEs with dual connectivity (DC) capabilities. The UE may associate with a primary or master Node B such as a master next generation Node B (MgNB), which may communicate via an LTE frequency, as well as with a secondary Node B such as a secondary next generation Node B (SgNB), which may communicate via NR frequencies. The RRM of the MgNB and the SgNB may communicate to coordinate measurement gap configurations for DC capable UEs. In particular, the RRM of the MgNB and/or the SgNB may determine a single measurement gap 4630 for LTE and NR frequency layers as well as offsets 4620 and 4622. The RRM may also select either the MgNB, the SgNB, or a combination of the MgNB and the SgNB to communicate the single measurement gap 4630 and offsets 4620 and 4622 to the UE. The sixth embodiment 4600 also illustrates the receipt of SSBs 4610 and 4612 via LTE and NR frequency ranges, respectively. In many embodiments, the offsets 4620 and 4622 may be different to align the measurement gap 4630 to receive the SSBs 4610 and 4612, respectively. Note that the measurement gap 4630 is periodic and has a period of MGRP such as 5 ms, 10 ms, 20 ms, 40 ms, 80 ms, and 160 ms. Note also that while the sixth embodiment 4600 illustrates receipt of the SSBs 4610 and 4612 simultaneously, the SSBs may not align exactly and, in some embodiments, the RRM may transmit the SSB 4610 and the SSB 4612 at alternating, or otherwise, different repetitions of the measurement gap 4630.

To illustrate, the RRM may select the MgNB to determine and/or transmit the measurement gap configuration via a LTE frequency layer to the UE if the RRM determines to assign a single measurement gap 4630 per UE and the cells of the MgNB and the SgNB are fully synchronized (or fully connected). Furthermore, the RRM may select the MgNB to determine and/or transmit the measurement gap configuration via an LTE frequency layer to the UE if the RRM determines to assign a single measurement gap 4630 per frequency range (FR).

In some embodiments, the RRM may identify frequency layers associated with the UE within a low frequency range, FR1, such as frequency layers between 450 MHz and up to 6 GHz and identify frequency layers associated with the UE within a high frequency range, FR2, such as frequency layers from 6 GHz to 90 GHz or above. The frequency range FR1 may include the LTE frequency layers and low NR frequency layers and the frequency range FR2 may include high NR frequency layers.

In such embodiments, the RRM may select the MgNB to determine and/or transmit the measurement gap configuration to the UE for frequency layers in FR1 and the RRM may select the SgNB to determine and/or transmit the measurement gap configuration to the UE for frequency layers in FR2.

FIG. 4H depicts an alternative sixth embodiment 4700 of measurement gap configuration of UEs with dual connectivity (DC) capabilities. The UE may associate with a primary or master Node B such as a master next generation Node B (MgNB) for LTE frequency communications as well as with a secondary Node B such as a secondary next generation Node B (SgNB) for NR frequency communications. The RRM of the MgNB may determine a measurement gap configuration for the UE for an LTE frequency and the SgNB may determine a measurement gap configuration for the UE for NR frequencies. In particular, the RRM of the MgNB may determine a measurement gap 4730 for an LTE frequency layer as well as an offset 4720. The RRM of the SgNB may determine a measurement gap 4732 for NR frequency layers as well as one or more offsets such as an offset 4722. The RRM may also select either the MgNB, the SgNB, or a combination of the MgNB and the SgNB to communicate the single measurement gap 4630 and offsets 4620 and 4622 to the UE. The alternative sixth embodiment 4700 also illustrates the receipt of SSBs 4710 and 4712 via LTE and NR frequency ranges, respectively. In many embodiments, the offsets 4720 and 4722 may be different to align the measurement gaps 4730 and 4732, respectively, to receive the SSBs 4710 and 4712, respectively. Note that the measurement gaps 4730 and 4732 are periodic and have periods of MGRPs such as 5 ms, 10 ms, 20 ms, 40 ms, 80 ms, and 160 ms.

FIG. 4I depicts a seventh embodiment 4800 of measurement gap configuration of NR-SS and CSI-RS for UEs with NR frequency layers. The RRM may determine a measurement gap configuration for an NR-SS and a CSI-RS to share the same measurement gap 4830. In some embodiments, the RRM may transmit the NR-SS and CSI-RS in the SSB 4810 during the same measurement gap 4830 simultaneously. In some embodiments, the RRM may transmit the NR-SS and CSI-RS in the SSB 4810 during the same measurement gap 4830 with different offsets 4820 and 4822. In further embodiments, the RRM may transmit the NR-SS and CSI-RS in different SSBs 4810 and 4812 during alternating or different repetition periods of the measurement gap 4830. In other words, the RRM may transmit the NR-SS in the SSB 4810 during a first period of the periodic, measurement gap 4830 and the RRM may transmit the CSI-RS in the SSB 4812 during a second or different period of the periodic, measurement gap 4830. Note that the measurement gap 4830 is periodic and has a period of MGRP such as 5 ms, 10 ms, 20 ms, 40 ms, 80 ms, and 160 ms.

FIG. 4J depicts a first alternative, seventh embodiment 4900 of measurement gap configuration of NR-SS and CSI-RS for UEs with NR frequency layers. The RRM may determine a first measurement gap 4930 for an NR-SS and a second measurement gap 4932 for a CSI-RS. In such embodiments, the RRM may transmit the NR-SS in an SSB 4910 during the measurement gap 4930 with an offset of 4920 and the RRM may transmit the CSI-RS in an SSB 4912 during the measurement gap 4932. Note that the measurement gaps 4930 and 4932 are periodic and have a period of MGRP such as 5 ms, 10 ms, 20 ms, 40 ms, 80 ms, and 160 ms.

FIG. 4K depicts a second alternative, seventh embodiment 4950 of measurement gap configuration of NR-SS and CSI-RS for UEs with NR frequency layers. The RRM may determine a first measurement gap 4980 for an NR-SS and a non-periodic measurement gap 4982 for a CSI-RS. In such embodiments, the RRM may transmit the NR-SS in an SSB 4960 during the measurement gap 4980 with an offset of 4970 and the RRM may transmit the CSI-RS 4962 during the measurement gap 4982. Note that the measurement gap 4980 is periodic and has a period of MGRP such as 5 ms, 10 ms, 20 ms, 40 ms, 80 ms, and 160 ms.

FIGS. 5A-C depict embodiments of uniform or non-uniform measurement gaps and interruption time measurement in synchronous and asynchronous, dual connectivity for both primary cell groups and secondary cell groups for user equipment, such as the user equipment shown in FIGS. 1 and 2. In particular, FIG. 5A illustrates communications 5000 of a UE with synchronous, dual connectivity. The communications include nine subframes (i through i+8) of a primary cell group (PCG) 5010 and nine subframes (j through j+8) of a secondary cell group (SCC) 5020. The synchronous aspect of the dual connectivity aligns the borders of each of the subframes in the PCG 5010 and the SCG 5020. Thus, when performing a measurement gap having a duration of six subframes in the PCG 5010, the interruption time in communication with the secondary base station associated with the SCG 5020, is the duration of the measurement gap, i.e., the duration of transmission or reception of six subframes.

For synchronous, dual connectivity as shown in FIG. 5A, subframe j is regarded as the subframe occurring immediately before the measurement gap for PCG 5010 and SCG 5020. Similarly, subframe j+7 is regarded as the subframe occurring immediately after the measurement gap for PCG 5010 and SCG 5020. Note also that the number of subframes in a radio frame depends on the bandwidth of the channel.

FIG. 5B illustrates communications 5100 of a UE with asynchronous, dual connectivity. The communications include nine subframes (i through i+8) of a primary cell group (PCG) 5110 and nine subframes (j through j+8) of a secondary cell group (SCG) 5120. The asynchronous aspect of the dual connectivity misaligns the borders of each of the subframes in the PCG 5110 and the SCG 5120. Thus, when performing a measurement gap having a duration of six subframes in the PCG 5110, the interruption time in communication with the secondary base station associated with the SCG 5120, is the duration of the measurement gap plus subframe j+7, i.e., the duration of transmission or reception of seven subframes due to the partial overlap of the seventh subframe by the measurement gap in the SCG 5120.

For asynchronous, dual connectivity as shown in FIG. 5B, subframe j is regarded as the subframe occurring immediately before the measurement gap for SCG 5120. Similarly, subframe j+8 is regarded as the subframe occurring immediately after the measurement gap for SCG 5120.

Referring now to FIGS. 5C-D, FIG. 5C depicts an embodiment 5200 of non-uniform measurement gaps for user equipment, such as the user equipment shown in FIGS. 1 and 2, and FIG. 5D depicts an embodiment of a table 5300 of non-uniform measurement gaps for user equipment indexed by a Gap Pattern identifier (ID) such as the non-uniform gaps illustrated in FIG. 5C. In FIGS. 5C-D, the measurement gap length (MGL) illustrates the duration of a measurement gap in milliseconds. The measurement gap repetition period (MGRP) illustrates the periodic repetition of the measurement gaps in milliseconds. The length of the MGRP (LMGRP) is the length or number of gaps in a burst of measurement gaps. Tburst is the period between measurement gaps bursts. T1 is the number of measurement gaps in the burst of measurement gaps during which the UE is expected to measure and retune. And T2 is the number of measurement gaps during a bust of measurement gaps that are not recognized as measurement gaps by the UE and by the base station.

The table 5300 of FIG. 5D shows the measurement gap patterns (or sets of measurement gaps) for nonUniform1-nonUniform4 gap IDs. A burst repetition period Tburst comprises T1 and T2. During T1, the UE performs measurement during the measurement gap. During T2, the UE suspends the measurement gap protocol. Both the UE and the base station can assume there are no measurement gaps during T2. T1 equals to number of gaps per burst in the table 5300 and Tburst is configured by the higher software layers. i.e., layers above the RRC layer.

For nonUniform1-nonUniform4 the total interruption time on SCG is same as for Gap Patten ID 0 (GP0) and Gap Pattern ID 1 (GP1) shown in table 5400 in FIG. 5E for both synchronous and asynchronous dual connectivity as shown in FIGS. 5A and 5B.

Figure 6A:
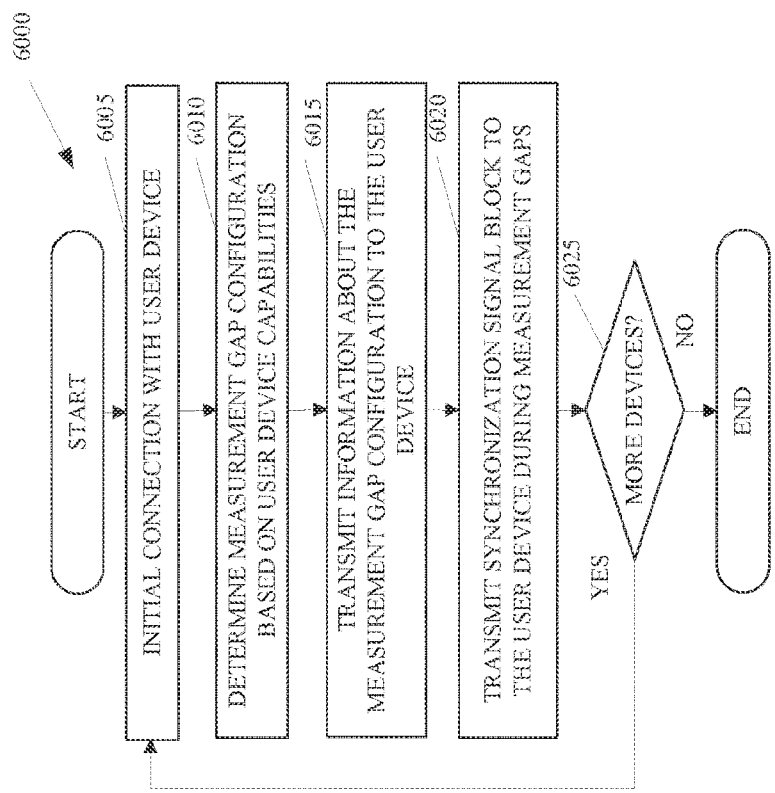

FIGS. 6A-B depict flowcharts of embodiments to determine a measurement gap configuration such as the measurement gap configurations described in conjunction with FIGS. 1-5E. FIG. 6A illustrates an embodiment of a flowchart 6000 to establish communications between a base station and a user device such the base station and user equipment, respectively, illustrated in FIGS. 1-2. At the beginning of the flowchart 6000, the base station may form an initial connection with the user device (element 6005). For example, the user device may transmit a request to establish a connection to the base station such as an initial communication to connect to the RRC layer of the base station and the base station may transmit a synchronization signal to the user device so the user device can measure the synchronization signal and synchronize to a channel. In some embodiments, the user device may comprise a wide or very wide bandwidth RF chain to support wide or very wide bandwidth communications.

In many embodiments, the user device may also transmit an RRC layer information element that includes information about the capabilities of the user device. The information about the capabilities may include information to indicate. e.g., which frequency layers that the user device supports, whether the user device supports coexistence of NR and LTE frequency layers, and/or whether the user device supports dual connectivity of NR and LTE frequency layers.

The base station may receive the information about the capabilities of the user device and parse the capabilities to determine a measurement gap configuration for the user device (element 6010). The base station may then determine the measurement gap configuration for the user device. For example, the base station may store, in memory, a table or other data structure that associates capabilities of the user device and measurement gap patterns such as the table 5300 illustrated in FIG. 5D and the table 5400 in FIG. 5E. The base station may compare the communication capabilities of the user device such as inter-frequency E-UTRAN FDD and TDD, UTRAN FDD, GSM EDGE Radio Access Network (GERAN), Least Cost Routing (LCR). TDD, HRPD, CDMA2000 1×, inter-frequency New Radio (NR), inter-RAT NR, and/or the like, against the measurement purpose of the each of the measurement gap patterns to determine which pattern(s) match. The base station may also select between the matching patterns based on other criteria.

Once the base station determines or selects a measurement gap pattern, the base station may transmit information about the measurement gap configuration to the user device (element 6015). In some embodiments, an RRM of the base station may coordinate with an RRM of a second base station to determine part of or all the measurement configuration for the user device. In other embodiments, an RRM of the base station may coordinate with an RRM of a second base station and the second base station may transmit part of or all the measurement configuration to the user device.

The base station may then transmit a synchronization signal block to the user device during measurement gaps (element 6020). For instance, the base station may transmit a measurement configuration for NR frequencies, an LTE frequency, and/or a CSI-RS to the user device. After establishing communications with the user device, the base station may establish connections with additional devices if more devices are transmitting connection requests (element 6025) and return to element 6005. Otherwise, the flowchart 6000 ends until another user device requests a connection.

FIG. 6B illustrates an embodiment of a flowchart 6100 for user device to establish connection with a base station such as the user equipment (UE) and base station in FIGS. 1-2. The flowchart 6100 begins with the user device transmitting a communication from an RRC layer of the user device to an RRC layer of the base station, which includes an information element to describe the capabilities of the user device (element 6105). The capabilities may include a capability for communication via one or more NR frequencies, one or more LTE frequencies, coexistence capabilities related to NR and LTE frequencies, dual connectivity capabilities related to NR and LTE frequencies, and/or the like.

After transmitting the capabilities of the user device, the user device may receive a measurement gap configuration, decode the measurement gap configuration, and parse the measurement gap configuration to determine a measurement gap pattern identification (ID) and channel state information reference signal measurement gap information (element 6110). In some embodiments, the user device may also parse the measurement gap configuration to determine one or more offsets associated with frequency layers, frequency ranges, cell identifications (IDs), and/or the user device.

Thereafter, the user device may receive from the base station, a synchronization signal or set of synchronization signals in a synchronization signal block (SSB) during one of the repetitions of the measurement gaps. The user device may take measurements of the synchronization signal(s) and synchronize a communications interface based on the synchronization signal(s) in the SSB (element 6115). For example, the user device may take measurements of the synchronization signal and determine qualities associated with the received signal such as the carrier frequency, weights to adjust the amplification of tones on each of the subcarriers in the synchronization signal and phase shifts to adjust the phase of the tones on each of the subcarriers.

After establishing a connection with the base station and synchronizing with the synchronization signal(s), the user device may communicate with the base station via one or more channels on NR frequencies and/or LTE frequencies.

Figure 7:
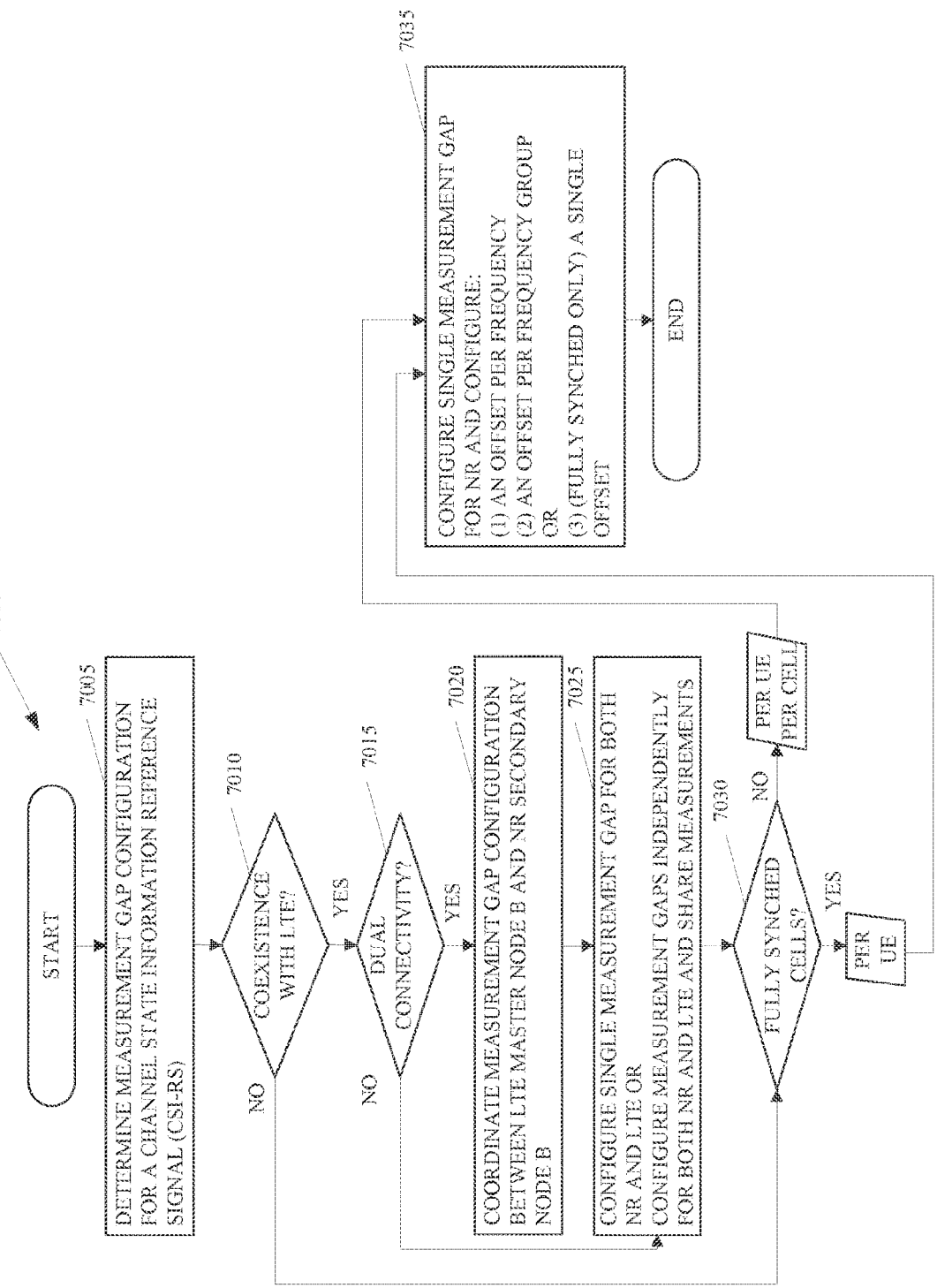
FIG. 7 depicts a flowchart of an embodiment to determine a measurement gap configuration such as the measurement gap configuration illustrated in FIGS. 4A-K.

FIG. 7 illustrates an embodiment of a flowchart 7000 to determine a measurement gap configuration by a base station for a user device such the base station and user equipment, respectively, illustrated in FIGS. 1-2. At the beginning of the flowchart 7000, the base station may receive capabilities information from the user device and, based on the capabilities information, the base station may determine a measurement gap configuration for a channel state information reference signal (CSI-RS) (element 7005) for a new radio (NR) of the user device. The CSI-RS is user device specific and the base station may transmit the CSI-RS via a dedicated signal. In some embodiments, the CSI-RS may share the same measurement gap as new radio synchronization signals (NR-SSs). In other embodiments, the base station may determine a separate measurement gap only for the CSI-RS. And, in still other embodiments, the base station may determine a single, non-periodic gap within which to transmit the CSI-RS based on CSI-RS resources configured by the base station. In other embodiments, the base station may determine the CSI-RS measurement gap after or concurrently with determining a measurement gap for synchronization signals for the NR frequency layers.

Based on the capabilities information, the base station may also determine if the user device supports the coexistence of NR with LTE (element 7010) and, if so, the base station may also determine if the user device supports dual connectivity (DC) of NR and LTE radio (element 7015). If the user device supports the DC of the NR and the LTE radio, the base station may coordinate measurement gap configuration between LTE master Node B (MgNB) and NR secondary Node B (SgNB) (element 7020). Coordination of the measurement gap configuration may involve determining a role for the MgNB and/or the SgNB in the determination and transmission of the measurement gap configuration to the user device. For example, if the MgNB is fully synchronized with an SgNB, the base station may determine a single measurement gap and a single measurement gap offset for the UE. In many embodiments, the single measurement gap may comprise a gap pattern ID.

On the other hand, if the MgNB is not fully synchronized with the SgNB, the base station may determine a single measurement gap per frequency range. In some embodiments, the base station may determine a low frequency range, FR1, that is below 6 GHz and a high frequency range, FR2, that is at or above 6 GHz. The MgNB may transmit a measurement gap configuration to the user device for the LTE frequencies and the low NR frequencies, and the SgNB may transmit the measurement configuration for the high NR frequencies.

The flowchart may continue with configuration of a single measurement gap for both NR and LTE or configuration of measurement gaps independently for both NR and LTE and share measurements (element 7025). For example, the MgNB may determine a measurement gap configuration for LTE frequency layers and the SgNB may determine a measurement gap configuration for the NR frequency layers.

If the MgNB and SgNB cells are fully synchronized (element 7030), the base station may assign a measurement configuration per UE. On the other hand, if the MgNB and SgNB cells are not fully synchronized (element 7030), the base station may assign a measurement configuration per UE per cell. In other words, if the cells are fully synchronized, or coordinated, the measurement gaps may align at each frequency layer of the NR and the LTE frequency ranges. If the cells are not fully synchronized, or coordinated, the measurement gaps may not align at each frequency layer for the NR and the LTE radio of the UE in each of the cells, so the measurement configuration may be determined for each cell.

Thereafter, the base station may configure a single measurement gap for NR and configure: (1) an offset per frequency, (2) an offset per frequency group, or (3) (fully synched only) a single offset (element 7035). For example, if the MgNB and SgNB cells are fully synchronized, the base station may configure the measurement gap with an offset per frequency. However, if the MgNB and SgNB cells are not fully synchronized, the base station may configure the measurement gap with an offset per frequency per cell. Furthermore, if the MgNB and SgNB cells are fully synchronized, the base station may configure the measurement gap with an offset per frequency range. And, if the MgNB and SgNB cells are not fully synchronized, the base station may configure the measurement gap with an offset per frequency range per cell.

Figure 8:
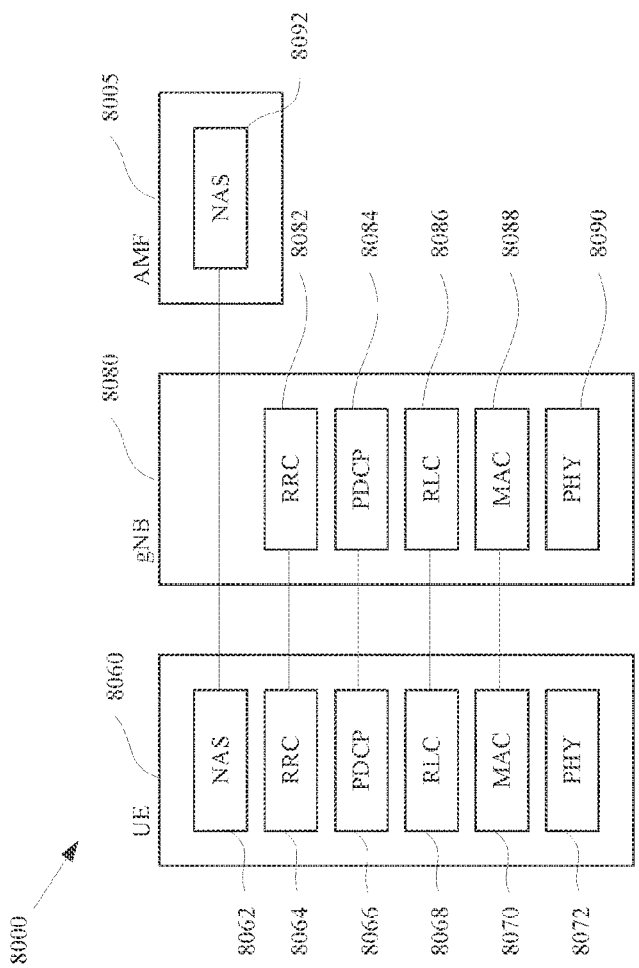
FIG. 8 depicts an embodiment of protocol entities in wireless communication devices such as the base station and user equipment shown in FIGS. 1-2.

FIG. 8 depicts an embodiment of protocol entities 8000 that may be implemented in wireless communication devices, including one or more of a user equipment (UE) 8060, a base station, which may be termed an evolved node B (eNB), or a new radio, next generation node B (gNB) 8080, and a network function, which may be termed a mobility management entity (MME), or an access and mobility management function (AMF) 8094, according to some aspects.

According to some aspects, gNB 8080 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 8060, gNB 8080 and AMF 8094, may be described as implementing all or part of a protocol stack in which the layers are considered to be ordered from lowest to highest in the order physical layer (PHY), medium access control (MAC), radio link control (RLC), packet data convergence protocol (PDCP), radio resource control (RRC) and non-access stratum (NAS). According to some aspects, one or more protocol entities that may be implemented in one or more of UE 8060, gNB 8080 and AMF 8094, may communicate with a respective peer protocol entity that may be implemented on another device, using the services of respective lower layer protocol entities to perform such communication.

According to some aspects, UE PHY layer 8072 and peer entity gNB PHY layer 8090 may communicate using signals transmitted and received via a wireless medium. According to some aspects, UE MAC layer 8070 and peer entity gNB MAC layer 8088 may communicate using the services provided respectively by UE PHY layer 872 and gNB PHY layer 8090. According to some aspects, UE RLC layer 8068 and peer entity gNB RLC layer 8086 may communicate using the services provided respectively by UE MAC layer 8070 and gNB MAC layer 8088. According to some aspects, UE PDCP layer 8066 and peer entity gNB PDCP layer 8084 may communicate using the services provided respectively by UE RLC layer 8068 and 5GNB RLC layer 8086. According to some aspects, UE RRC layer 8064 and gNB RRC layer 8082 may communicate using the services provided respectively by UE PDCP layer 8066 and gNB PDCP layer 8084. According to some aspects, UE NAS 8062 and AMF NAS 8092 may communicate using the services provided respectively by UE RRC layer 8064 and gNB RRC layer 8082.

The PHY layer 8072 and 8090 may transmit or receive information used by the MAC layer 8070 and 8088 over one or more air interfaces. The PHY layer 8072 and 8090 may further perform link adaptation or adaptive modulation and coding (AMC), power control, cell search (e.g., for initial synchronization and handover purposes), and other measurements used by higher layers, such as the RRC layer 8064 and 8082. The PHY layer 8072 and 8090 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 8070 and 8088 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 8068 and 8086 may operate in a plurality of modes of operation, including: Transparent Mode (TM), Unacknowledged Mode (UM), and Acknowledged Mode (AM). The RLC layer 8068 and 8086 may execute transfer of upper layer protocol data units (PDUs), error correction through automatic repeat request (ARQ) for AM data transfers, and concatenation, segmentation and reassembly of RLC SDUs for UM and AM data transfers. The RLC layer 8068 and 8086 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 8066 and 8084 may execute header compression and decompression of Internet Protocol (IP) data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 8064 and 8082 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging. RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 8060 and the RAN node, gNB 8080 may utilize a Uu interface (e.g., an LTE-Uu interface) to exchange control plane data via a protocol stack comprising the PHY layer 8072 and 8090, the MAC layer 8070 and 8088, the RLC layer 8068 and 8086, the PDCP layer 8066 and 8084, and the RRC layer 8064 and 8082.

The non-access stratum (NAS) protocols 8092 form the highest stratum of the control plane between the UE 8060 and the AMF 8005. The NAS protocols 8092 support the mobility of the UE 8060 and the session management procedures to establish and maintain IP connectivity between the UE 8060 and the Packet Data Network (PDN) Gateway (P-GW).

Figure 9:
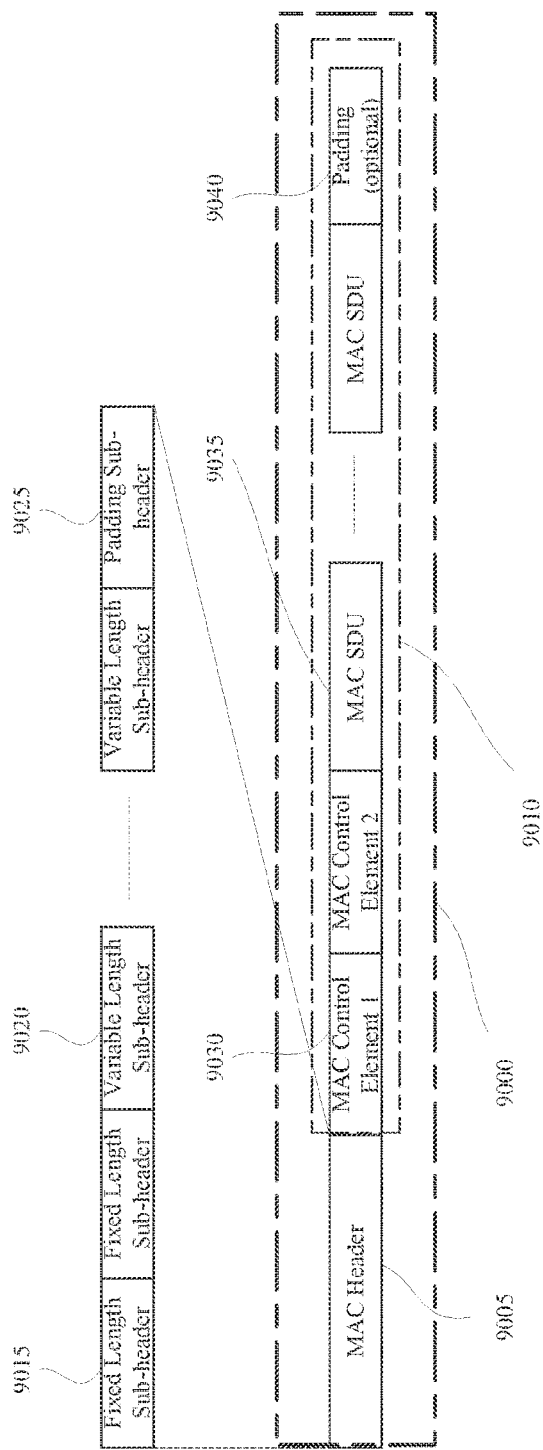
FIG. 9 depicts embodiments of the formats of physical layer data units (PDUs) that form via baseband circuitry and RF transceiver circuitry such as the baseband circuitry and the RF transceivers in FIG. 2.
Figure 13:
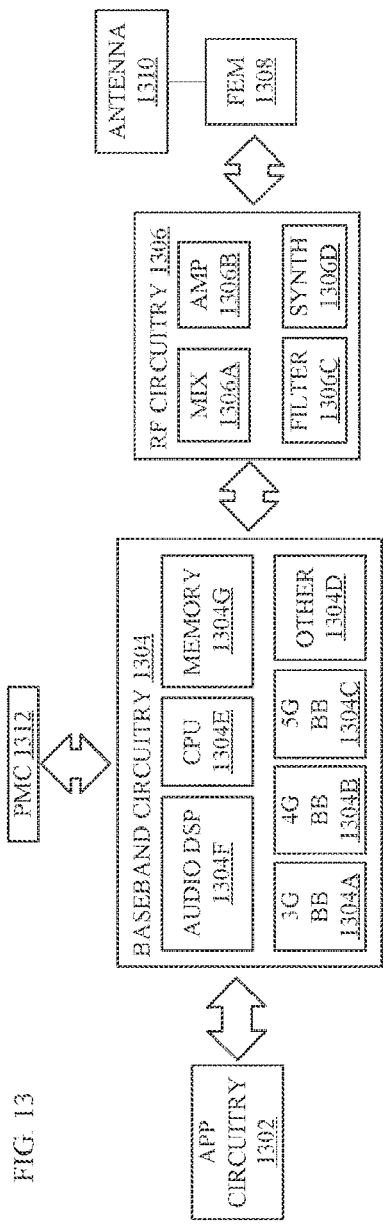
FIG. 13 depicts an embodiment of a device such as a base station or user equipment shown in FIGS. 1-2.
Figure 14:
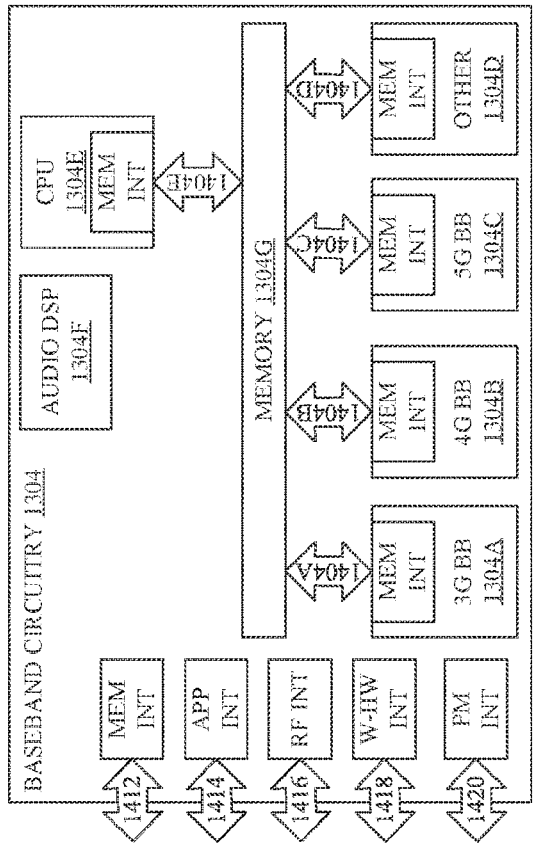
FIG. 14 depicts an embodiment of interfaces of baseband circuitry such as the baseband circuitry in FIG. 2.

FIG. 9 illustrates embodiments of the formats of PHY data units (PDUs) that may be transmitted by the PHY device via one or more antennas and be encoded and decoded by a MAC entity such as the processors 203 and 213 in FIG. 2, the baseband circuitry 1304 in FIGS. 13 and 14 according to some aspects. In several embodiments, higher layer frames such as a frame comprising an RRC layer information element may transmit from the base station to the UE or vice versa as one or more MAC Service Data Units (MSDUs) in a payload of one or more PDUs in one or more subframes of a radio frame.

According to some aspects, a MAC PDU 9100 may consist of a MAC header 9105 and a MAC payload 9110, the MAC payload consisting of zero or more MAC control elements 9130, zero or more MAC service data unit (SDU) portions 9135 and zero or one padding portion 9140. According to some aspects. MAC header 8105 may consist of one or more MAC sub-headers, each of which may correspond to a MAC payload portion and appear in corresponding order. According to some aspects, each of the zero or more MAC control elements 9130 contained in MAC payload 9110 may correspond to a fixed length sub-header 9115 contained in MAC header 9105. According to some aspects, each of the zero or more MAC SDU portions 9135 contained in MAC payload 9110 may correspond to a variable length sub-header 9120 contained in MAC header 8105. According to some aspects, padding portion 9140 contained in MAC payload 9110 may correspond to a pudding sub-header 9125 contained in MAC header 9105.

FIG. 10A illustrates an embodiment of communication circuitry 1000 such as the circuitry in the base station 201 and the user equipment 211 shown in FIG. 2. The communication circuitry 1000 is alternatively grouped according to functions. Components as shown in the communication circuitry 1000 are shown here for illustrative purposes and may include other components not shown here in FIG. 10A.

The communication circuitry 1000 may include protocol processing circuitry 1005, which may implement one or more of medium access control (MAC), radio link control (RLC), packet data convergence protocol (PDCP), radio resource control (RRC) and non-access stratum (NAS) functions. The protocol processing circuitry 1005 may include one or more processing cores (not shown) to execute instructions and one or more memory structures (not shown) to store program and data information.

The communication circuitry 1000 may further include digital baseband circuitry 1010, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 1000 may further include transmit circuitry 1015, receive circuitry 1020 and/or antenna array 1030 circuitry.

The communication circuitry 1000 may further include radio frequency (RF) circuitry 1025 such as the RF circuitry 208 and 218 in FIG. 2. In an aspect of an embodiment, RF circuitry 1025 may include multiple parallel RF chains for one or more of transmit or receive functions, each connected to one or more antennas of the antenna array 1030.

In an aspect of the disclosure, the protocol processing circuitry 1005 may include one or more instances of control circuitry (not shown) to provide control functions for one or more of digital baseband circuitry 1010, transmit circuitry 1015, receive circuitry 1020, and/or radio frequency circuitry 1025.

FIG. 10B illustrates an embodiment of radio frequency circuitry 1025 in FIG. 10A according to some aspects such as a RF circuitry 208 and 218 illustrated in FIG. 2. The radio frequency circuitry 1025 may include one or more instances of radio chain circuitry 1072, which in some aspects may include one or more filters, power amplifiers, low noise amplifiers, programmable phase shifters and power supplies (not shown).

The radio frequency circuitry 1025 may include power combining and dividing circuitry 1074. In some aspects, power combining and dividing circuitry 1074 may operate bidirectionally, such that the same physical circuitry may be configured to operate as a power divider when the device is transmitting, and as a power combiner when the device is receiving. In some aspects, power combining and dividing circuitry 1074 may one or more include wholly or partially separate circuitries to perform power dividing when the device is transmitting and power combining when the device is receiving. In some aspects, power combining and dividing circuitry 1074 may include passive circuitry comprising one or more two-way power divider/combiners arranged in a tree. In some aspects, power combining and dividing circuitry 1074 may include active circuitry comprising amplifier circuits.

In some aspects, the radio frequency circuitry 1025 may connect to transmit circuitry 1015 and receive circuitry 1020 in FIG. 10A via one or more radio chain interfaces 1076 or a combined radio chain interface 1078. The combined radio chain interface 1078 may form a wide or very wide bandwidth.

In some aspects, one or more radio chain interfaces 1076 may provide one or more interfaces to one or more receive or transmit signals, each associated with a single antenna structure which may comprise one or more antennas.

In some aspects, the combined radio chain interface 1078 may provide a single interface to one or more receive or transmit signals, each associated with a group of antenna structures comprising one or more antennas.

Figure 11:
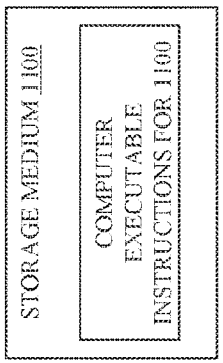
FIG. 11 depicts an embodiment of a storage medium described herein.

FIG. 11 illustrates an example of a storage medium 1100 to store processor data structures. Storage medium 1100 may comprise an article of manufacture. In some examples, storage medium 1100 may include any non-transitory computer readable medium or machine-readable medium, such as an optical, magnetic or semiconductor storage. Storage medium 1100 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 12:
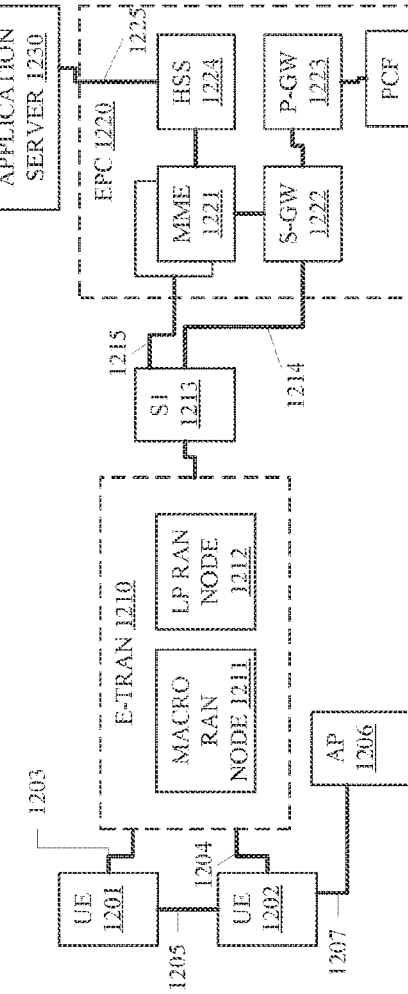
FIG. 12 depicts an embodiment of an architecture of a system of a network such as the communication network in FIG. 1.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touch screen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) LIE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may to connect. e.g., communicatively couple, with a radio access network (RAN)—in this embodiment, an Evolved Universal Mobile Telecommunications System (UMTS) Terrestrial Radio Access Network (E-UTRAN) 1210. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PIT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.11 protocol, wherein the AP 1206 would comprise a wireless fidelity (WiFi®) router. In this example, the AP 1206 is shown to be connected to the Internet without connecting to the core network of the wireless system (described in further detail below). The E-UTRAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The E-UTRAN 1210 may include one or more RAN nodes for providing macro-cells, e.g., macro RAN node 1211, and one or more RAN nodes for providing femto-cells or pico-cells (e.g., cells having smaller coverage areas, smaller user capacity, or higher bandwidth compared to macro-cells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the E-UTRAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level. L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 1211 and 1212 may communicate with one another and/or with other access nodes in the E-UTRAN 1210 and/or in another RAN via an X2 interface, which is a signaling interface for communicating data packets between ANs. Some other suitable interface for communicating data packets directly between ANs may be used.

The E-UTRAN 1210 is shown to be communicatively coupled to a core network —in this embodiment, an Evolved Packet Core (EPC) network 1220 via an SI interface 1213. In this embodiment the SI interface 1213 is split into two parts: the SI-U interface 1214, which carries traffic data between the RAN nodes 1211 and 1212 and the serving gateway (S-GW) 1222, and the SI-mobility management entity (MME) interface 1215, which is a signaling interface between the RAN nodes 1211 and 1212 and MMEs 1221.

In this embodiment, the EPC network 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The EPC network 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the SI interface 1213 towards the E-UTRAN 1210, and routes data packets between the E-UTRAN 1210 and the EPC network 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1220 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the EPC network 1220.

The P-GW 1223 may further be a node for policy enforcement and charging data collection. Policy and Charging Enforcement Function (PCRF) 1226 is the policy and charging control element of the EPC network 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

FIG. 13 illustrates example components of a device 1300 in accordance with some embodiments. In some embodiments, the device 1300 may include application circuitry 1302, baseband circuitry 1304. Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. The baseband circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). In many embodiments, the fourth generation (4G) baseband processor 1304B may include capabilities for generation and processing of the baseband signals for LTE radios and the fifth generation (5G) baseband processor 1304C may capabilities for generation and processing of the baseband signals for NRs.

The baseband circuitry 1304 (e.g., one or more of baseband processors 1304A-D) may handle various radio control functions that enable communication with one or more radio networks via the RF circuitry 1306. In other embodiments, some of or all the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc.

In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some of or all the constituent components of the baseband circuitry 1304 and the application circuitry 1302 may be implemented together such as, for example, on a system on a chip (SOC). In some embodiments, the baseband circuitry 1304 may provide for communication compatible with one or more radio technologies. For example, in some embodiments, the baseband circuitry 1304 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

The RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. The RF circuitry 1306 may include a receive signal path which may include circuitry to down-convert RF signals received from the FEM circuitry 1308 and provide baseband signals to the baseband circuitry 1304. The RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. The RF circuitry 1306 may also include synthesizer circuitry 1306d for synthesizing a frequency, or component carrier, for use by the mixer circuitry 1306a of the receive signal path and the transmit signal path. In some embodiments, the mixer circuitry 1306a of the receive signal path may to down-convert RF signals received from the FEM circuitry 1308 based on the synthesized frequency provided by synthesizer circuitry 1306d. The amplifier circuitry 1306b may amplify the down-converted signals and the filter circuitry 1306c may be a low-pass filter (LPF) or band-pass filter (BPF) to remove unwanted signals from the down-converted signals to generate output baseband signals. Output baseband signals may be provided to the baseband circuitry 1304 for further processing.

In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be an output of a voltage-controlled oscillator (VCO), although that is not a requirement. Divider control input may be an output of either the baseband circuitry 1304 or an application processor of the applications circuitry 1302 depending on the desired output frequency. Some embodiments may determine a divider control input (e.g., N) from a look-up table based on a channel indicated by the applications circuitry 1302.

The synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1306d may generate a carrier frequency (or component carrier) as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, the RF circuitry 1306 may include an IQ/polar converter.

The FEM circuitry 1308 may include a receive signal path which may include circuitry to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM circuitry 1308, or in both the RF circuitry 1306 and the FEM circuitry 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In the present embodiment, the radio refers to a combination of the RF circuitry 130 and the FEM circuitry 1308. The radio refers to the portion of the circuitry that generates and transmits or receives and processes the radio signals. The RF circuitry 1306 includes a transmitter to generate the time domain radio signals with the data from the baseband signals and apply the radio signals to subcarriers of the carrier frequency that form the bandwidth of the channel. The PA in the FEM circuitry 1308 amplifies the tones for transmission and amplifies tones received from the one or more antennas 1310 via the LNA to increase the signal-to-noise ratio (SNR) for interpretation. In wireless communications, the FEM circuitry 1308 may also search for a detectable pattern that appears to be a wireless communication. Thereafter, a receiver in the RF circuitry 1306 converts the time domain radio signals to baseband signals via one or more functional modules such as the functional modules shown in the base station 201 and the user equipment 211 illustrated in FIG. 2.

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM circuitry 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The processors of the application circuitry 1302 and the processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1302 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
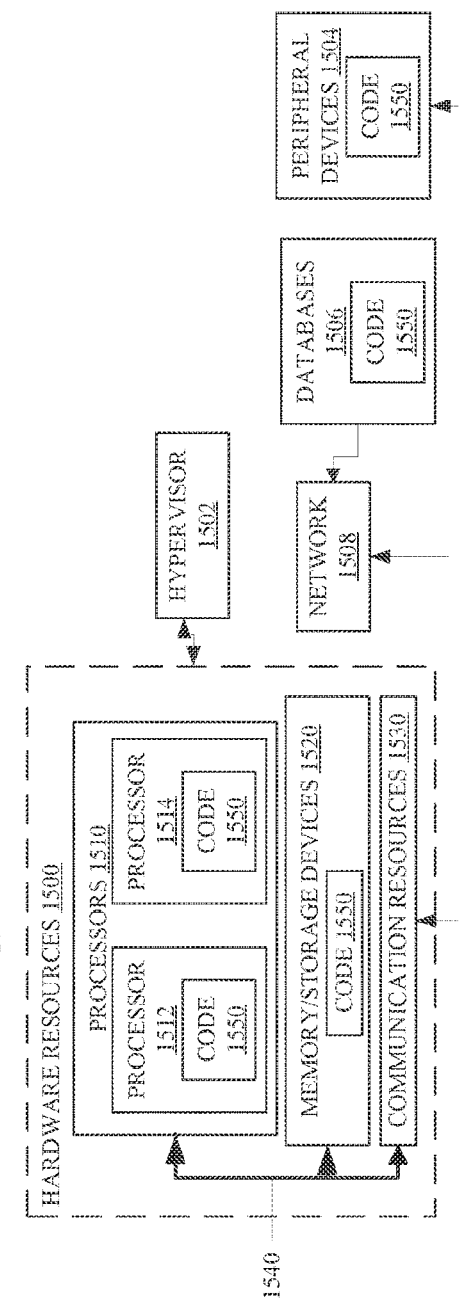
FIG. 15 depicts an embodiment of a block diagram of components.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically. FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

In embodiments, one or more elements of FIGS. 12, 13, 14, and/or 15 may be configured to perform one or more processes, techniques, or methods as described herein, or portions thereof. In embodiments, one or more elements of FIGS. 12, 13, 14, and/or 15 may be configured to perform one or more processes, techniques, or methods, or portions thereof, as described in the following examples.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Processing circuitry, logic circuitry, devices, and interfaces herein described may perform functions implemented in hardware and also implemented with code executed on one or more processors. Processing circuitry, or logic circuitry, refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits or circuitry to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

Several embodiments have one or more potentially advantages effects. For instance, determining, by the baseband logic circuitry, based on an indication of a capability to support new radio frequency layers from the capabilities for the user device, a measurement gap configuration for the new radio frequency layers and for a channel state information reference signal (CSI-RS) advantageously provides measurement gaps for measurement of new radio frequency layers and channel state information. Determining a measurement gap configuration to support new radio frequency layers for the user device for a cell that is independent of measurement gap configuration to support new radio frequency layers of other user devices for the cell advantageously provides measurement gaps for measurement of new radio frequency layers. Determining a measurement gap configuration to support new radio frequency layers for the user device for a cell that is independent of measurement gap configuration to support new radio frequency layers for the user device for a different cell advantageously provides measurement gaps for measurement of new radio frequency layers. Determining a measurement gap configuration that comprises a measurement gap for each of the new radio frequency layers for the user device that comprises a measurement gap for each of the new radio frequency layers for the user device per cell associated with the user device advantageously provides measurement gaps for measurement of new radio frequency layers. Determining a measurement gap configuration that comprises a measurement gap for more than one frequency range of the new radio frequency layers for the user device advantageously provides measurement gaps for measurement of new radio frequency layers. Determining a measurement gap configuration that comprises a measurement gap for more than one frequency range of the new radio frequency layers for the user device per cell associated with the user device advantageously provides measurement gaps for measurement of new radio frequency layers. Determining a measurement gap configuration that comprises a single measurement gap for both the new radio frequency layers for the user device and one or more Long Technology Evolution (LTE) frequency layers for the user device advantageously provides measurement gaps for measurement of new radio frequency layers and coexisting LTE frequency layers. Determining a measurement gap configuration that comprises a single measurement gap for the new radio frequency layers for the user device and a separate measurement gap for one or more Long Technology Evolution (LTE) frequency layers for the user device advantageously provides measurement gaps for measurement of new radio frequency layers and coexisting LTE frequency layers. Determining a measurement gap configuration that comprises a single, periodic measurement gap shared with a new radio synchronization signal for the new radio frequency layers advantageously provides measurement gaps for measurement of new radio frequency layers and coexisting LTE frequency layers. Determining a measurement gap configuration that comprises a periodic measurement gap for the channel state information reference signal that is separate from a periodic measurement gap for the new radio frequency layers for the user device advantageously provides measurement gaps for measurement of new radio frequency layers and the CSI-RS. Determining a measurement gap configuration that comprises a single, non-periodic measurement gap for the channel state information reference signal advantageously measurement gaps for measurement of new radio frequency layers and the CSI-RS.

EXAMPLES OF FURTHER EMBODIMENTS

The following examples pertain to further embodiments. Specifics in the examples may be used anywhere in one or more embodiments.

Example 1 is an apparatus to perform measurement gap configuration, comprising: processing circuitry to decode uplink data with an initial communication from a user device, wherein the initial communication comprises capabilities; and to determine, based on an indication of a capability to support new radio frequency layers from the capabilities for the user device, a measurement gap configuration for the new radio frequency layers and for a channel state information reference signal; and an interface to send a frame with a preamble to a physical layer comprising the measurement gap configuration. In Example 2, the apparatus of Example 1, wherein the processing circuitry is configured to determine a measurement gap configuration to support new radio frequency layers for the user device for a cell that is independent of measurement gap configuration to support new radio frequency layers of other user devices for the cell. In Example 3, the apparatus of Example 1, wherein the processing circuitry is configured to determine a measurement gap configuration to support new radio frequency layers for the user device for a cell that is independent of a measurement gap configuration to support the new radio frequency layers for the user device for a different cell. In Example 4, the apparatus of Example 1, wherein the measurement gap configuration comprises a measurement gap for each of the new radio frequency layers for the user device. In Example 5, the apparatus of Example 1, wherein the measurement gap configuration comprises a measurement gap for each of the new radio frequency layers for the user device per cell associated with the user device. In Example 6, the apparatus of Example 1, wherein the measurement gap configuration comprises a measurement gap for more than one frequency range of the new radio frequency layers for the user device. In Example 8, the apparatus of Example 1, the measurement gap configuration comprises a measurement gap for more than one frequency range of the new radio frequency layers for the user device per cell associated with the user device. In Example 8, the apparatus of Example 1, wherein the measurement gap configuration comprises a single measurement gap for both the new radio frequency layers for the user device and one or more Long Technology Evolution (LTE) frequency layers for the user device. In Example 9, the apparatus of Example 1, wherein the measurement gap configuration comprises a single measurement gap for the new radio frequency layers for the user device and a separate measurement gap for one or more Long Technology Evolution (LTE) frequency layers for the user device. In Example 10, the apparatus of Example 1, wherein the measurement gap configuration comprises a single, periodic measurement gap shared with a new radio synchronization signal for the new radio frequency layers. In Example 11, the apparatus of Example 1, wherein the measurement gap configuration comprises a periodic measurement gap for the channel state information reference signal that is separate from a periodic measurement gap for the new radio frequency layers for the user device. In Example 12, the apparatus of any Example 1-11, wherein the measurement gap configuration comprises a single, non-periodic measurement gap for the channel state information reference signal. In Example 13, the apparatus of any Example 1-11, wherein the processing circuitry comprises a processor and a memory coupled with the processor, the apparatus further comprising a radio coupled with a physical layer device of the physical layer, and one or more antennas coupled with the radio to communicate with the user device.

Example 14 is a method to perform wide bandwidth communications, comprising: decoding, by baseband logic circuitry, uplink data for an initial communication from a user device, wherein the initial communication comprises capabilities: determining, by the baseband logic circuitry, based on an indication of a capability to support new radio frequency layers from the capabilities for the user device, a measurement gap configuration for the new radio frequency layers and for a channel state information reference signal (CSI-RS); and sending, by the baseband logic circuitry via an interface, a frame with a preamble to a physical layer, the frame comprising the measurement gap configuration. In Example 15, the method of Example 14, further comprising determining a measurement gap configuration to support new radio frequency layers for the user device for a cell that is independent of a measurement gap configuration to support the new radio frequency layers of other user devices for the cell. In Example 16, the method of Example 14, further comprising determining a measurement gap configuration to support new radio frequency layers for the user device for a cell that is independent of measurement gap configuration to support new radio frequency layers for the user device for a different cell. In Example 17, the method of Example 14, wherein the measurement gap configuration comprises a measurement gap for each of the new radio frequency layers for the user device. In Example 18, the method of Example 14, wherein the measurement gap configuration comprises a measurement gap for each of the new radio frequency layers for the user device per cell associated with the user device. In Example 19, the method of Example 14, wherein the measurement gap configuration comprises a measurement gap for more than one frequency range of the new radio frequency layers for the user device. In Example 20, the method of Example 14, wherein the measurement gap configuration comprises a measurement gap for more than one frequency range of the new radio frequency layers for the user device per cell associated with the user device. In Example 21, the method of Example 14, wherein the measurement gap configuration comprises a single measurement gap for both the new radio frequency layers for the user device and one or more Long Technology Evolution (LTE) frequency layers for the user device. In Example 22, the method of Example 14, wherein the measurement gap configuration comprises a single measurement gap for the new radio frequency layers for the user device and a separate measurement gap for one or more Long Technology Evolution (LTE) frequency layers for the user device. In Example 23, the method of any Example 14-22, wherein the measurement gap configuration comprises a single, periodic measurement gap for the CSI-RS shared with a new radio synchronization signal for the new radio frequency layers. In Example 24, the method of any Example 14-22, wherein the measurement gap configuration comprises a periodic measurement gap for the channel state information reference signal that is separate from a periodic measurement gap for the new radio frequency layers for the user device. In Example 25, the method of any Example 14-22, wherein the measurement gap configuration comprises a single, non-periodic measurement gap for the channel state information reference signal.

Example 26 is a system to perform measurement gap configuration, comprising: one or more antennas; baseband circuitry to decode uplink data with an initial communication from a user device, wherein the initial communication comprises capabilities; and to determine, based on an indication of a capability to support new radio frequency layers from the capabilities for the user device, a measurement gap configuration for the new radio frequency layers and for a channel state information reference signal; and an interface coupled with the baseband circuitry to send a frame with a preamble to a physical layer comprising the measurement gap configuration; and a physical layer device coupled with the interface and the one or more antennas to transmit the frame. In Example 27, the system of Example 20, wherein the baseband circuitry comprises a processor and a memory coupled with the processor, the system further comprising a radio coupled with the physical layer device, and the one or more antennas coupled with the radio to communicate with the user device. In Example 28, the system of Example 20, wherein the baseband circuitry is configured to determine a measurement gap configuration to support new radio frequency layers for the user device for a cell that is independent of measurement gap configuration to support new radio frequency layers of other user devices for the cell. In Example 29, the system of Example 20, wherein the baseband circuitry is configured to determine a measurement gap configuration to support new radio frequency layers for the user device for a cell that is independent of a measurement gap configuration to support the new radio frequency layers for the user device for a different cell. In Example 30, the system of Example 20, wherein the measurement gap configuration comprises a measurement gap for each of the new radio frequency layers for the user device. In Example 31, the system of Example 20, wherein the measurement gap configuration comprises a measurement gap for each of the new radio frequency layers for the user device per cell associated with the user device. In Example 32, the system of Example 20, wherein the measurement gap configuration comprises a measurement gap for more than one frequency range of the new radio frequency layers for the user device. In Example 33, the system of Example 20, the measurement gap configuration comprises a measurement gap for more than one frequency range of the new radio frequency layers for the user device per cell associated with the user device. In Example 34, the system of Example 20, wherein the measurement gap configuration comprises a single measurement gap for both the new radio frequency layers for the user device and one or more Long Technology Evolution (LTE) frequency layers for the user device. In Example 35, the system of Example 20, wherein the measurement gap configuration comprises a single measurement gap for the new radio frequency layers for the user device and a separate measurement gap for one or more Long Technology Evolution (LTE) frequency layers for the user device. In Example 36, the system of any Example 20-35, wherein the measurement gap configuration comprises a single, periodic measurement gap shared with a new radio synchronization signal for the new radio frequency layers. In Example 37, the system of any Example 20-35, wherein the measurement gap configuration comprises a periodic measurement gap for the channel state information reference signal that is separate from a periodic measurement gap for the new radio frequency layers for the user device. In Example 38, the system of any Example 20-35, wherein the measurement gap configuration comprises a single, non-periodic measurement gap for the channel state information reference signal.

Example 39 is a non-transitory machine-readable medium containing instructions, which when executed by a processor, cause the processor to perform operations comprising operations to: decode uplink data for an initial communication from a user device, wherein the initial communication comprises capabilities; determine, based on an indication of a capability to support new radio frequency layers from the capabilities for the user device, a measurement gap configuration for the new radio frequency layers and for a channel state information reference signal (CSI-RS); and send, via an interface, a frame with a preamble to a physical layer, the frame comprising the measurement gap configuration. In Example 40, the machine-readable medium of Example 39, wherein the operations further comprise operations to determine a measurement gap configuration to support new radio frequency layers for the user device for a cell that is independent of measurement gap configuration to support new radio frequency layers of other user devices for the cell. In Example 41, the machine-readable medium of Example 39, wherein the operations further comprise operations to determine a measurement gap configuration to support new radio frequency layers for the user device for a cell that is independent of a measurement gap configuration to support the new radio frequency layers for the user device for a different cell. In Example 42, the machine-readable medium of Example 39, wherein the measurement gap configuration comprises a measurement gap for each of the new radio frequency layers for the user device. In Example 43, the machine-readable medium of Example 39, wherein the measurement gap configuration comprises a measurement gap for each of the new radio frequency layers for the user device per cell associated with the user device. In Example 44, the machine-readable medium of Example 39, wherein the measurement gap configuration comprises a measurement gap for more than one frequency range of the new radio frequency layers for the user device. In Example 45, the machine-readable medium of Example 39, wherein the measurement gap configuration comprises a measurement gap for more than one frequency range of the new radio frequency layers for the user device per cell associated with the user device. In Example 46, the machine-readable medium of Example 39, wherein the measurement gap configuration comprises a single measurement gap for both the new radio frequency layers for the user device and one or more Long Technology Evolution (LTE) frequency layers for the user device. In Example 47, the machine-readable medium of Example 39, wherein the measurement gap configuration comprises a single measurement gap for the new radio frequency layers for the user device and a separate measurement gap for one or more Long Technology Evolution (LTE) frequency layers for the user device. In Example 48, the machine-readable medium of any Example 39-47, wherein the measurement gap configuration comprises a single, periodic measurement gap for the CSI-RS shared with a new radio synchronization signal for the new radio frequency layers. In Example 49, the machine-readable medium of any Example 39-47, wherein the measurement gap configuration comprises a periodic measurement gap for the channel state information reference signal that is separate from a periodic measurement gap for the new radio frequency layers for the user device. In Example 50, the machine-readable medium of any Example 39-47, wherein the measurement gap configuration comprises a single, non-periodic measurement gap for the channel state information reference signal.

Example 51, a device to perform measurement gap configuration, comprising: a means for decoding uplink data for an initial communication from a user device, wherein the initial communication comprises capabilities; a means for determining based on an indication of a capability to support new radio frequency layers from the capabilities for the user device, a measurement gap configuration for the new radio frequency layers and for a channel state information reference signal (CSI-RS); and a means for sending, via an interface, a frame with a preamble to a physical layer, the frame comprising the measurement gap configuration. In Example 52, the device of Example 51, further comprising a means for communicating with the user device, one or more radio frames via a physical layer device coupled with an antenna. In Example 53, the device of Example 51, further comprising a means for determining a measurement gap configuration to support new radio frequency layers for the user device for a cell that is independent of a measurement gap configuration to support the new radio frequency layers for the user device for a different cell. In Example 54, the device of Example 51, wherein the measurement gap configuration comprises a measurement gap for each of the new radio frequency layers for the user device. In Example 55, the device of Example 51, wherein the measurement gap configuration comprises a measurement gap for each of the new radio frequency layers for the user device per cell associated with the user device. In Example 56, the device of Example 51, wherein the measurement gap configuration comprises a measurement gap for more than one frequency range of the new radio frequency layers for the user device. In Example 57, the device of Example 51, wherein the measurement gap configuration comprises a measurement gap for more than one frequency range of the new radio frequency layers for the user device per cell associated with the user device. In Example 58, the device of Example 51, wherein the measurement gap configuration comprises a single measurement gap for both the new radio frequency layers for the user device and one or more Long Technology Evolution (LTE) frequency layers for the user device. In Example 59, the device of Example 51, wherein the measurement gap configuration comprises a single measurement gap for the new radio frequency layers for the user device and a separate measurement gap for one or more Long Technology Evolution (LTE) frequency layers for the user device. In Example 60, the device of any Example 51-59, wherein the measurement gap configuration comprises a single, periodic measurement gap for the CSI-RS shared with a new radio synchronization signal for the new radio frequency layers. In Example 61, the device of any Example 51-59, wherein the measurement gap configuration comprises a periodic measurement gap for the channel state information reference signal that is separate from a periodic measurement gap for the new radio frequency layers for the user device. In Example 62, the device of any Example 51-59, wherein the measurement gap configuration comprises a single, non-periodic measurement gap for the channel state information reference signal.

Example 63 is an apparatus to perform measurement gap configuration, comprising: an interface; and processing circuitry coupled with the interface to send an initial communication to a physical layer, wherein the initial communication comprises capabilities for a user device; to decode downlink data with a measurement gap configuration; and to parse the measurement gap configuration to determine at least one measurement gap identification and at least one offset for the new radio frequency layers and a channel state information reference signal. In Example 64, the apparatus of Example 63, wherein the processing circuitry comprises a processor and a memory coupled with the processor, the apparatus further comprising a radio coupled with a physical layer device of the physical layer, and one or more antennas coupled with the radio to communicate with the user device. In Example 65, the apparatus of Example 63, wherein the measurement gap configuration for the new radio frequency layers and for a channel state information reference signal for the user device for a cell is independent of a measurement gap configuration to support new radio frequency layers of other user devices for the cell. In Example 66, the apparatus of Example 63, wherein the measurement gap configuration for the new radio frequency layers and for a channel state information reference signal for the user device for a cell is independent of a measurement gap configuration to support the new radio frequency layers of the user device for a different cell. In Example 67, the apparatus of Example 63, wherein the measurement gap configuration comprises a measurement gap for each of the new radio frequency layers for the user device. In Example 68, the apparatus of Example 63, wherein the measurement gap configuration comprises a measurement gap for each of the new radio frequency layers for the user device per cell associated with the user device. In Example 69, the apparatus of Example 63, wherein the measurement gap configuration comprises a measurement gap for more than one frequency range of the new radio frequency layers for the user device. In Example 70, the apparatus of Example 63, the measurement gap configuration comprises a measurement gap for more than one frequency range of the new radio frequency layers for the user device per cell associated with the user device. In Example 71, the apparatus of Example 63, wherein the measurement gap configuration comprises a single measurement gap for both the new radio frequency layers for the user device and one or more Long Technology Evolution (LTE) frequency layers for the user device. In Example 72, the apparatus of Example 63, wherein the measurement gap configuration comprises a single measurement gap for the new radio frequency layers for the user device and a separate measurement gap for one or more Long Technology Evolution (LTE) frequency layers for the user device. In Example 73, the apparatus of any Example 6372, wherein the measurement gap configuration comprises a single, periodic measurement gap shared with a new radio synchronization signal for the new radio frequency layers. In Example 74, the apparatus of any Example 63-72, wherein the measurement gap configuration comprises a periodic measurement gap for the channel state information reference signal that is separate from a periodic measurement gap for the new radio frequency layers for the user device. In Example 75, the apparatus of any Example 63-72, wherein the measurement gap configuration comprises a single, non-periodic measurement gap for the channel state information reference signal.

Example 76 is a method to perform measurement gap configuration, comprising: sending, by baseband circuitry, an initial communication to a physical layer, wherein the initial communication comprises capabilities for a user device; decoding, by baseband logic circuitry, downlink data with a measurement gap configuration; and parsing, by baseband logic circuitry, the measurement gap configuration to determine at least one measurement gap identification and at least one offset for the new radio frequency layers and a channel state information reference signal. In Example 77, the method of Example 76, wherein the measurement gap configuration for the new radio frequency layers and for a channel state information reference signal for the user device for a cell is independent of a measurement gap configuration to support new radio frequency layers of other user devices for the cell. In Example 78, the method of Example 76, wherein the measurement gap configuration for the new radio frequency layers and for a channel state information reference signal for the user device for a cell is independent of a measurement gap configuration to support the new radio frequency layers of the user device for a different cell. In Example 79, the method of Example 76, wherein the measurement gap configuration comprises a measurement gap for each of the new radio frequency layers for the user device. In Example 80, the method of Example 76, wherein the measurement gap configuration comprises a measurement gap for each of the new radio frequency layers for the user device per cell associated with the user device. In Example 81, the method of Example 76, wherein the measurement gap configuration comprises a measurement gap for more than one frequency range of the new radio frequency layers for the user device. In Example 82, the method of Example 76, the measurement gap configuration comprises a measurement gap for more than one frequency range of the new radio frequency layers for the user device per cell associated with the user device. In Example 83, the method of Example 76, wherein the measurement gap configuration comprises a single measurement gap for both the new radio frequency layers for the user device and one or more Long Technology Evolution (LTE) frequency layers for the user device. In Example 84, the method of Example 76, wherein the measurement gap configuration comprises a single measurement gap for the new radio frequency layers for the user device and a separate measurement gap for one or more Long Technology Evolution (LTE) frequency layers for the user device. In Example 85, the method of any Example 76-84, wherein the measurement gap configuration comprises a single, periodic measurement gap shared with a new radio synchronization signal for the new radio frequency layers. In Example 86, the method of any Example 76-84, wherein the measurement gap configuration comprises a periodic measurement gap for the channel state information reference signal that is separate from a periodic measurement gap for the new radio frequency layers for the user device. In Example 87, the method of any Example 76-84, wherein the measurement gap configuration comprises a single, non-periodic measurement gap for the channel state information reference signal.

Example 88, a system to perform measurement gap configuration comprising: one or more antennas; baseband circuitry coupled with an interface to send an initial communication to a physical layer, wherein the initial communication comprises capabilities for a user device; to decode downlink data with a measurement gap configuration; and to parse the measurement gap configuration to determine at least one measurement gap identification and at least one offset for the new radio frequency layers and a channel state information reference signal; and a physical layer device of the physical layer coupled with the baseband circuitry and the one or more antennas to receive measurement gap information from a base station. In Example 89, the system of Example 88, wherein the baseband circuitry comprises a processor and a memory coupled with the processor, the system further comprising a radio coupled with the physical layer device, and the one or more antennas coupled with the radio to communicate with the user device. In Example 90, the system of Example 88, wherein the measurement gap configuration for the new radio frequency layers and for a channel state information reference signal for the user device for a cell is independent of a measurement gap configuration to support new radio frequency layers of other user devices for the cell. In Example 91, the system of Example 88, wherein the measurement gap configuration for the new radio frequency layers and for a channel state information reference signal for the user device for a cell is independent of a measurement gap configuration to support the new radio frequency layers of the user device for a different cell. In Example 92, the system of Example 88, wherein the measurement gap configuration comprises a measurement gap for each of the new radio frequency layers for the user device. In Example 93, the system of Example 88, wherein the measurement gap configuration comprises a measurement gap for each of the new radio frequency layers for the user device per cell associated with the user device. In Example 94, the system of Example 88, wherein the measurement gap configuration comprises a measurement gap for more than one frequency range of the new radio frequency layers for the user device. In Example 95, the system of Example 88, the measurement gap configuration comprises a measurement gap for more than one frequency range of the new radio frequency layers for the user device per cell associated with the user device. In Example 96, the system of Example 88, wherein the measurement gap configuration comprises a single measurement gap for both the new radio frequency layers for the user device and one or more Long Technology Evolution (LTE) frequency layers for the user device. In Example 97, the system of Example 88, wherein the measurement gap configuration comprises a single measurement gap for the new radio frequency layers for the user device and a separate measurement gap for one or more Long Technology Evolution (LTE) frequency layers for the user device. In Example 98, the system of any Example 88-97, wherein the measurement gap configuration comprises a single, periodic measurement gap shared with a new radio synchronization signal for the new radio frequency layers. In Example 99, the system of any Example 88-97, wherein the measurement gap configuration comprises a periodic measurement gap for the channel state information reference signal that is separate from a periodic measurement gap for the new radio frequency layers for the user device. In Example 100, the system of any Example 88-97, wherein the measurement gap configuration comprises a single, non-periodic measurement gap for the channel state information reference signal.

Example 101 is a non-transitory machine-readable medium containing instructions, which when executed by a processor, cause the processor to perform operations comprising operations to: sending, by baseband circuitry, an initial communication to a physical layer, wherein the initial communication comprises capabilities for a user device; decoding, by baseband logic circuitry, downlink data with a measurement gap configuration; and parsing, by baseband logic circuitry, the measurement gap configuration to determine at least one measurement gap identification and at least one offset for the new radio frequency layers and a channel state information reference signal. In Example 102, the machine-readable medium of Example 101, wherein the measurement gap configuration for the new radio frequency layers and for a channel state information reference signal for the user device for a cell is independent of a measurement gap configuration to support new radio frequency layers of other user devices for the cell. In Example 103, the machine-readable medium of Example 101, wherein the measurement gap configuration for the new radio frequency layers and for a channel state information reference signal for the user device for a cell is independent of a measurement gap configuration to support the new radio frequency layers of the user device for a different cell. In Example 104, the machine-readable medium of Example 101, wherein the measurement gap configuration comprises a measurement gap for each of the new radio frequency layers for the user device. In Example 105, the machine-readable medium of Example 101, wherein the measurement gap configuration comprises a measurement gap for each of the new radio frequency layers for the user device per cell associated with the user device. In Example 106, the machine-readable medium of Example 101, wherein the measurement gap configuration comprises a measurement gap for more than one frequency range of the new radio frequency layers for the user device. In Example 107, the machine-readable medium of Example 101, the measurement gap configuration comprises a measurement gap for more than one frequency range of the new radio frequency layers for the user device per cell associated with the user device. In Example 108, the machine-readable medium of Example 101, wherein the measurement gap configuration comprises a single measurement gap for both the new radio frequency layers for the user device and one or more Long Technology Evolution (LTE) frequency layers for the user device. In Example 109, the machine-readable medium of Example 101, wherein the measurement gap configuration comprises a single measurement gap for the new radio frequency layers for the user device and a separate measurement gap for one or more Long Technology Evolution (LTE) frequency layers for the user device. In Example 110, the machine-readable medium of any Example 101-109, wherein the measurement gap configuration comprises a single, periodic measurement gap shared with a new radio synchronization signal for the new radio frequency layers. In Example 111, the machine-readable medium of any Example 101-109, wherein the measurement gap configuration comprises a periodic measurement gap for the channel state information reference signal that is separate from a periodic measurement gap for the new radio frequency layers for the user device. In Example 112, the machine-readable medium of any Example 101-109, wherein the measurement gap configuration comprises a single, non-periodic measurement gap for the channel state information reference signal.

Example 113 is a device to perform measurement gap configuration, comprising: a means for sending an initial communication to a physical layer, wherein the initial communication comprises capabilities for a user device; a means for decoding downlink data with a measurement gap configuration; and a means for parsing the measurement gap configuration to determine at least one measurement gap identification and at least one offset for the new radio frequency layers and a channel state information reference signal. In Example 114, the device of Example 113, wherein the measurement gap configuration for the new radio frequency layers and for a channel state information reference signal for the user device for a cell is independent of a measurement gap configuration to support new radio frequency layers of other user devices for the cell. In Example 115, the device of Example 113, wherein the measurement gap configuration for the new radio frequency layers and for a channel state information reference signal for the user device for a cell is independent of a measurement gap configuration to support the new radio frequency layers of the user device for a different cell. In Example 116, the device of Example 113, wherein the measurement gap configuration comprises a measurement gap for each of the new radio frequency layers for the user device. In Example 117, the device of Example 113, wherein the measurement gap configuration comprises a measurement gap for each of the new radio frequency layers for the user device per cell associated with the user device. In Example 118, the device of Example 113, wherein the measurement gap configuration comprises a measurement gap for more than one frequency range of the new radio frequency layers for the user device. In Example 119, the device of Example 113, the measurement gap configuration comprises a measurement gap for more than one frequency range of the new radio frequency layers for the user device per cell associated with the user device. In Example 120, the device of Example 113, wherein the measurement gap configuration comprises a single measurement gap for both the new radio frequency layers for the user device and one or more Long Technology Evolution (LTE) frequency layers for the user device. In Example 121, the device of Example 113, wherein the measurement gap configuration comprises a single measurement gap for the new radio frequency layers for the user device and a separate measurement gap for one or more Long Technology Evolution (LTE) frequency layers for the user device. In Example 122, the device of any Example 113-121, wherein the measurement gap configuration comprises a single, periodic measurement gap shared with a new radio synchronization signal for the new radio frequency layers. In Example 123, the device of any Example 113-121, wherein the measurement gap configuration comprises a periodic measurement gap for the channel state information reference signal that is separate from a periodic measurement gap for the new radio frequency layers for the user device. In Example 124, the device of any Example 113-121, wherein the measurement gap configuration comprises a single, non-periodic measurement gap for the channel state information reference signal.

What is claimed is:

1. An apparatus to perform measurement gap configuration, comprising:
   processing circuitry configured to
      decode uplink data with an initial communication from a user device, wherein the initial communication comprises capabilities; and
      determine, based on an indication of a capability to support dual connectivity (DC) of new radio frequency layers and Long Technology Evolution (LTE) frequency layers from the capabilities for the user device, a measurement gap configuration for the LTE frequency layers and for the new radio frequency layers to measure a channel state information reference signal,
      wherein the measurement gap configuration indicates that the measurement gap configuration applies to all frequency layers of the LTE frequency layers and the new radio frequency layers or that the measurement gap configuration applies to LTE frequency layers and new radio frequency layers within an indicated frequency range; and
   an interface to send a frame to a physical layer comprising the measurement gap configuration.

2. The apparatus of claim 1, wherein the measurement gap configuration comprises a measurement gap for each of the new radio frequency layers for the user device per cell associated with the user device.

3. The apparatus of claim 1, wherein the measurement gap configuration comprises a measurement gap for more than one frequency range of the new radio frequency layers for the user device.

4. The apparatus of claim 1, wherein the measurement gap configuration comprises a single measurement gap for both the new radio frequency layers for the user device and one or more Long Technology Evolution (LTE) frequency layers for the user device.

5. The apparatus of claim 1, wherein the measurement gap configuration comprises a periodic measurement gap for the channel state information reference signal that is separate from a periodic measurement gap for the new radio frequency layers for the user device.

6. The apparatus of claim 1, wherein the measurement gap configuration comprises a single, non-periodic measurement gap for the channel state information reference signal.

7. The apparatus of claim 1, wherein the processing circuitry comprises a processor and a memory coupled with the processor, the apparatus further comprising a radio coupled with a physical layer device of the physical layer, and one or more antennas coupled with the radio to communicate with the user device.

8. A method to perform measurement gap configuration, comprising:
   decoding, by baseband logic circuitry, uplink data for an initial communication from a user device, wherein the initial communication comprises capabilities;
   determining, by the baseband logic circuitry, based on an indication from the capabilities for the user device, a capability of the user device to support dual connectivity (DC) of new radio frequency layers and Long Technology Evolution (LTE) frequency layers, a measurement gap configuration for the LTE frequency layers and for the new radio frequency layers to measure a channel state information reference signal (CSI-RS), wherein the measurement gap configuration indicates that the measurement gap configuration applies to one or more options selected from all frequency layers of the LTE frequency layers and the new radio frequency layers, and LTE frequency layers and new radio frequency layers within an indicated frequency range; and
   sending, by the baseband logic circuitry via an interface, a frame to a physical layer, the frame comprising the measurement gap configuration.

9. The method of claim 8, wherein the measurement gap configuration comprises a measurement gap for more than one frequency range of the new radio frequency layers for the user device per cell associated with the user device.

10. The method of claim 8, wherein the measurement gap configuration comprises a single measurement gap for the new radio frequency layers for the user device and a separate measurement gap for one or more Long Technology Evolution (LTE) frequency layers for the user device.

11. The method of claim 8, wherein the measurement gap configuration comprises a single, periodic measurement gap for the CSI-RS shared with a new radio synchronization signal for the new radio frequency layers.

12. A non-transitory machine-readable medium containing instructions, which when executed by a processor, cause the processor to perform operations comprising operations to:
   decode uplink data for an initial communication from a user device, wherein the initial communication comprises capabilities;
   determine, based on an indication of a capability to support dual connectivity (DC) of new radio frequency layers- and Long Technology Evolution (LTE) frequency layers from the capabilities for the user device, a measurement gap configuration for the LTE frequency layers and for the new radio frequency layers to measure a channel state information reference signal (CSI-RS),
   wherein the measurement gap configuration indicates that the measurement gap configuration applies to one or more options selected from: all frequency layers of the LTE frequency layers and the new radio frequency layers, LTE frequency layers and new radio frequency layers within a first indicated frequency range, and LTE frequency layers and new radio frequency layers within a second indicated frequency range different than the first indicated frequency range; and
   send, via an interface, a frame to a physical layer, the frame comprising the measurement gap configuration.

13. The non-transitory machine-readable medium of claim 12, wherein the measurement gap configuration comprises a measurement gap for more than one frequency range of the new radio frequency layers for the user device.

14. The non-transitory machine-readable medium of claim 12, wherein the measurement gap configuration comprises a measurement gap for more than one frequency range of the new radio frequency layers for the user device per cell associated with the user device.

15. The non-transitory machine-readable medium of claim 12, wherein the measurement gap configuration comprises a single measurement gap for both the new radio frequency layers for the user device and one or more Long Technology Evolution (LTE) frequency layers for the user device.

16. An apparatus to perform measurement gap configuration, comprising processing circuitry configured to:
   send an initial communication to a physical layer, wherein the initial communication comprises capabilities for a user device indicating that the user device has capability to support dual connectivity (DC) of new radio frequency layers and Long Technology Evolution (LTE) frequency layers;
   decode downlink data with a measurement gap configuration, wherein the measurement gap configuration indicates that the measurement gap configuration applies to all frequency layers of the LTE frequency layers and the new radio frequency layers or that the measurement gap configuration applies to LTE frequency layers and new radio frequency layers within an indicated frequency range; and
   parse the measurement gap configuration to determine at least one measurement gap identification and at least one offset for the LTE frequency layers and the new radio frequency layers.

17. The apparatus of claim 16, wherein the processing circuitry comprises a processor and a memory coupled with the processor, the apparatus further comprising a radio coupled with a physical layer device of the physical layer, and one or more antennas coupled with the radio to communicate with the user device.

18. The apparatus of claim 16, wherein the measurement gap configuration comprises a measurement gap for more than one frequency range of the new radio frequency layers for the user device.

19. The apparatus of claim 16, wherein the measurement gap configuration comprises a single measurement gap for the new radio frequency layers for the user device and a separate measurement gap for one or more Long Technology Evolution (LTE) frequency layers for the user device.

20. A method to perform measurement gap configuration, comprising:
   sending, by baseband circuitry, an initial communication to a physical layer, wherein the initial communication comprises capabilities for a user device indicating that the user device has capability to support dual connectivity (DC) of new radio frequency layers and Long Technology Evolution (LTE) frequency layers;
   decoding, by baseband logic circuitry, downlink data with a measurement gap configuration, wherein the measurement gap configuration indicates that the measurement gap configuration applies to one or more options selected from: all frequency layers of the LTE frequency layers and the new radio frequency layers, LTE frequency layers and new radio frequency layers within a first indicated frequency range, and LTE frequency layers and new radio frequency layers within a second indicated frequency range different than the first indicated frequency range; and
   parsing, by baseband logic circuitry, the measurement gap configuration to determine at least one measurement gap identification and at least one offset for the LTE frequency layers and the new radio frequency layers.

21. The method of claim 20, wherein the measurement gap configuration comprises a single, periodic measurement gap for measuring a channel state information reference signal (CSI-RS) and shared with a new radio synchronization signal for the new radio frequency layers.

22. The method of claim 20, wherein the measurement gap configuration comprises a periodic measurement gap for a channel state information reference signal that is separate from a periodic measurement gap for the new radio frequency layers for the user device.

23. A non-transitory machine-readable medium containing instructions, which when executed by a processor, cause the processor to perform operations comprising operations to:
   sending, by baseband circuitry, an initial communication to a physical layer, wherein the initial communication comprises capabilities for a user device indicating that the user device has capability to support dual connectivity (DC) of new radio frequency layers and Long Technology Evolution (LTE) frequency layers;
   decoding, by baseband logic circuitry, downlink data with a measurement gap configuration, wherein the measurement gap configuration indicates that the measurement gap configuration applies to one or more options selected from all frequency layers of the LTE frequency layers and the new radio frequency layers, and LTE frequency layers and new radio frequency layers within an indicated frequency range; and
   parsing, by baseband logic circuitry, the measurement gap configuration to determine at least one measurement gap identification and at least one offset for the LTE frequency layers and the new radio frequency layers.

24. The non-transitory machine-readable medium of claim 23, wherein the measurement gap configuration comprises a single, periodic measurement gap for measuring a channel state information reference signal (CSI-RS) and shared with a new radio synchronization signal for the new radio frequency layers.

25. The non-transitory machine-readable medium of claim 23, wherein the measurement gap configuration comprises a periodic measurement gap for a channel state information reference signal that is separate from a periodic measurement gap for the new radio frequency layers for the user device.

* * * * *